US012300191B2

(12) United States Patent
Okuda et al.

(10) Patent No.: US 12,300,191 B2
(45) Date of Patent: May 13, 2025

(54) DISPLAY DEVICE AND DISPLAY METHOD WITH DISTORTION SUPPRESSION

(71) Applicant: Japan Display Inc., Tokyo (JP)

(72) Inventors: Koichi Okuda, Tokyo (JP); Shinichi Komura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/414,631

(22) Filed: Jan. 17, 2024

(65) Prior Publication Data

US 2024/0249694 A1 Jul. 25, 2024

(30) Foreign Application Priority Data

Jan. 24, 2023 (JP) ................................ 2023-008677

(51) Int. Cl.
*G09G 3/36* (2006.01)

(52) U.S. Cl.
CPC ....... *G09G 3/3648* (2013.01); *G09G 2320/02* (2013.01)

(58) Field of Classification Search
CPC ......................... G09G 2320/02; G09G 3/3648
See application file for complete search history.

(56) References Cited

U.S. PATENT DOCUMENTS

2013/0016138 A1* 1/2013 Sasaki .................. G09G 3/3648 345/204
2019/0079234 A1 3/2019 Takagi et al.
2019/0265493 A1 8/2019 Takagi et al.
2019/0265494 A1 8/2019 Takagi et al.
2023/0186438 A1* 6/2023 Wagenaar ............ H04N 19/117 345/647
2023/0314813 A1* 10/2023 Yamaguchi ........ G02B 27/0172 345/647

FOREIGN PATENT DOCUMENTS

JP 2019-053152 A 4/2019
JP 2019-148626 A 9/2019
JP 2019-148627 A 9/2019

* cited by examiner

*Primary Examiner* — Chun-Nan Lin
(74) *Attorney, Agent, or Firm* — K&L Gates LLP

(57) ABSTRACT

A display device includes a display panel, an optical element configured to collect light emitted from the display panel to user's eyes, and a drive circuit configured to drive the display panel based on an image signal having information on an image. The drive circuit generates a corrected image obtained by applying correction to the image to cause distortion, based on distortion caused by the optical element, and displays the corrected image on the display panel.

4 Claims, 23 Drawing Sheets

DISPLAY DEVICE AND DISPLAY METHOD WITH DISTORTION SUPPRESSION

CROSS-REFERENCE TO RELATED APPLICATION

This application claims the benefit of priority from Japanese Patent Application No. 2023-008677 filed on Jan. 24, 2023, the entire contents of which are incorporated herein by reference.

BACKGROUND

1. Technical Field

The present disclosure relates to a display device and a display method.

2. Description of the Related Art

Japanese Patent Application Laid-open Publication No. 2019-53152, Japanese Patent Application Laid-open Publication No. 2019-148626, and Japanese Patent Application Laid-open Publication No. 2019-148627 disclose virtual image display devices configured to allow a user to view an image displayed on an image element through a lens.

In such a virtual image display device (display device) including a lens (optical element) as described above, distortion is generated by the optical element. Specifically, the image viewed by the user is distorted. Therefore, there is a need to suppress the distortion caused by the optical element.

It is an object of the present disclosure to provide a display device that can suppress distortion.

SUMMARY

A display device according to the present disclosure includes a display panel, an optical element configured to collect light emitted from the display panel to user's eyes, and a drive circuit configured to drive the display panel based on an image signal having information on an image. The drive circuit generates a corrected image obtained by applying correction to the image to cause distortion, based on distortion caused by the optical element, and displays the corrected image on the display panel.

A display method performed by a display device configured to collect light emitted by a display panel to user's eyes by means of an optical element is disclosed. The display method includes acquiring an image signal including information on an image, correcting the image based on distortion caused by the optical element, and displaying the corrected image on the display panel.

DETAILED DESCRIPTION

Embodiments of the present disclosure will be described below with reference to the drawings. The present disclosure is not limited by what is described in the following embodiments. Components described below include those that can be easily assumed by a person skilled in the art and those that are substantially the same. Furthermore, the components described below can be combined as appropriate.

What is disclosed herein is merely an example, and any appropriate modification that would be easily conceived of by a person skilled in the art, while maintaining the purport of the present disclosure, is naturally included in the scope of the present disclosure. The drawings may schematically illustrate the width, thickness, shape, and the like of each part compared to the actual mode for the sake of clarity of explanation, but this is merely an example and does not limit the interpretation of the present disclosure. In the present specification and the drawings, elements similar to those described previously with respect to the drawings already mentioned are given the same reference signs and the detailed description thereof may be omitted as appropriate.

First Embodiment

Figure 1:
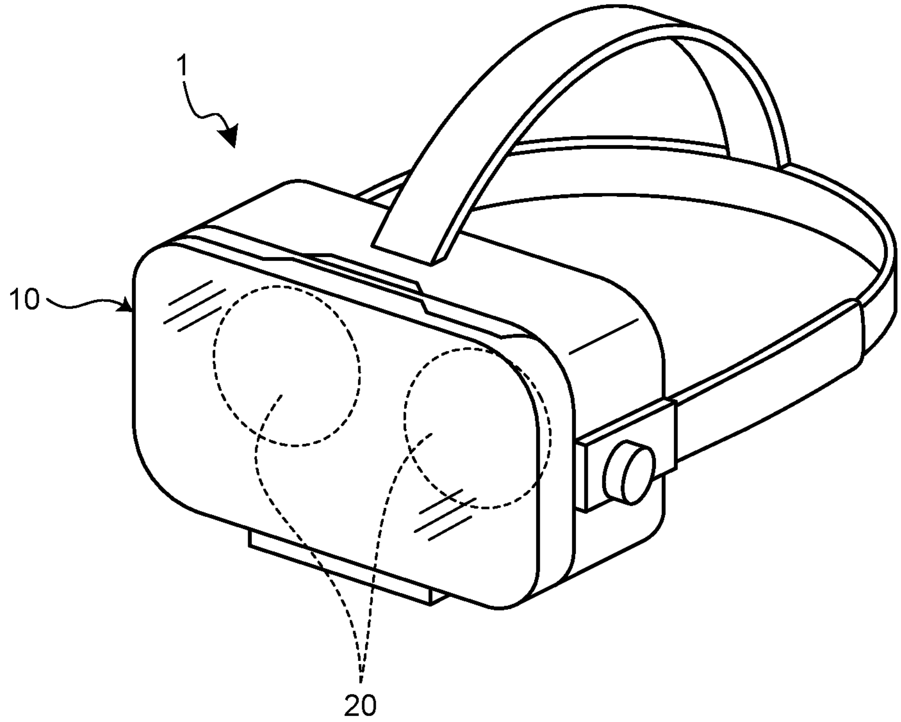
FIG. 1 is a perspective view of a display device according to a first embodiment of the present disclosure.

FIG. 1 is a perspective view of a display device 1 according to a first embodiment of the present disclosure. In this first embodiment, the display device 1 is worn on a user's head and changes the display as the user moves. The display device 1 is, for example, a virtual reality (VR) system that stereoscopically displays images indicating three-dimensional objects in a virtual space, and the like, and that changes the stereoscopic display according to the user's head orientation (position), to create a sense of virtual reality for the user. Examples of images include, but are not limited to, computer graphic images and 360-degree live-action images.

The display device 1 is electrically coupled to an external device (not illustrated) by wired or wireless means. The external device is an electronic apparatus such as a personal computer and a game machine. The external device may be a server device located on the Internet.

The external device transmits, to the display device 1, image signals including information on an image. The image has two images that are different from each other using parallax of the user's two eyes. The two images are an image for the user's right eye and an image for the user's left eye. The image signal includes information on a red gradation value, a green gradation value, and a blue gradation value of a plurality of pixels P to be described below.

Figure 2:
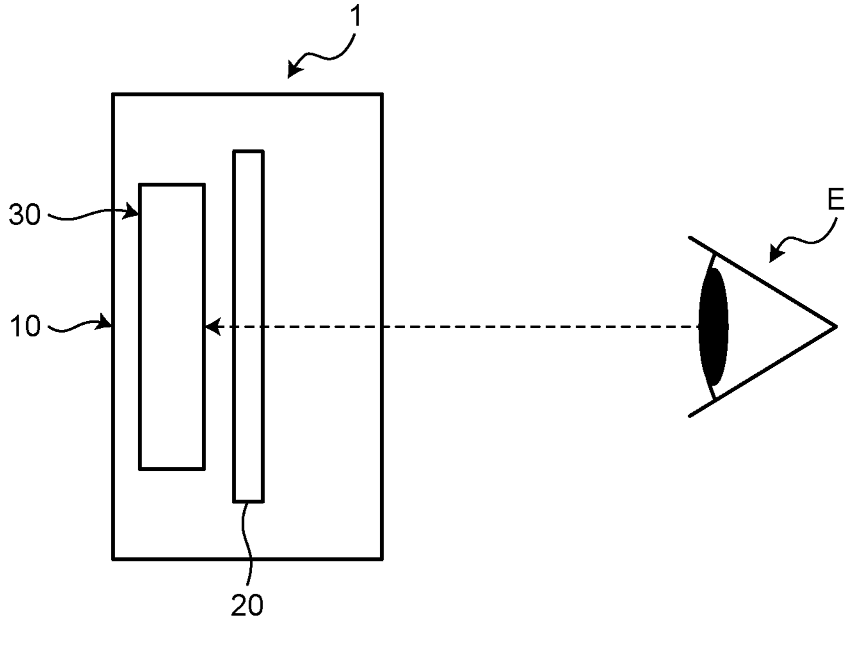
FIG. 2 is a schematic view illustrating a configuration of the display device illustrated in FIG. 1.

FIG. 2 is a schematic view illustrating a configuration of the display device 1 illustrated in FIG. 1. As illustrated in FIGS. 1 and 2, the display device 1 includes a mounting part 10, two optical elements 20, and a display system 30.

The mounting part 10 is worn on the user's head, covering the user's both eyes. The mounting part 10 is, for example, a headset, a goggle, a helmet, and a mask. The two optical elements 20 and the display system 30 are fixed to the mounting part 10. The mounting part 10 may further include an output part (not illustrated) that outputs sound signals output from the external device.

The two optical elements 20 are positioned so as to face the user's eyes E. The two optical elements 20 correspond to both eyes of the user. The two optical elements 20 are positioned between the display system 30 and the user's eyes E. The details of the optical elements 20 will be described below.

The display system 30 is positioned on the opposite side of the user's eyes E across the two optical elements 20. The display system 30 displays the image on the basis of the image signals.

Figure 3:
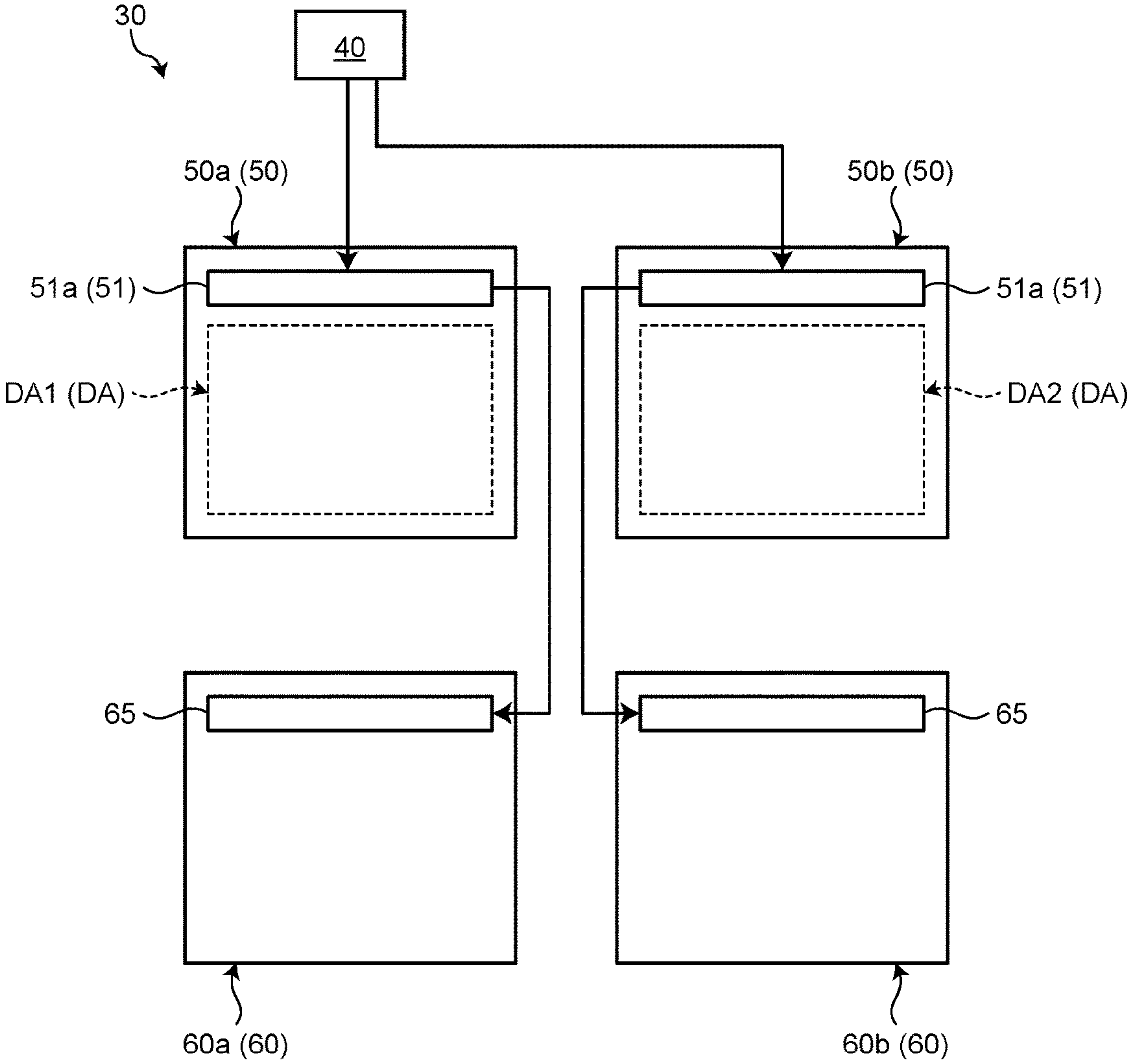
FIG. 3 is a block diagram of a display system illustrated in FIG. 2.

FIG. 3 is a block diagram of the display system 30 illustrated in FIG. 2. The display system 30 includes an image separation circuit 40, a first display panel 50*a*, a second display panel 50*b*, a first lighting device 60*a*, and a second lighting device 60*b*.

The image separation circuit 40 acquires image signals including information on an image from the external device. The image separation circuit 40 outputs an image signal including information on an image for the left eye to the first display panel 50*a*, and outputs an image signal including information on an image for the right eye to the second display panel 50*b*.

The first display panel 50*a* and the second display panel 50*b* are transmissive liquid crystal displays. The first display panel 50*a* and the second display panel 50*b* may be, for example, organic electroluminescent (EL) displays and inorganic EL displays. A first display region DA1 where images are displayed on the first display panel 50*a* faces the user's left eye. A second display region DA2 where images are displayed on the second display panel 50*b* faces the user's right eye.

The first display panel 50*a* and the second display panel 50*b* have the same configuration as each other. Hereinafter, when the first display panel 50*a* and the second display panel 50*b* are described without distinction, they may simply be referred to as a "display panel 50". When the first display region DAL and the second display region DA2 are described without distinction, they may simply be referred to as a "display region DA".

The first lighting device 60*a* and the second lighting device 60*b* have the same configuration as each other. Hereinafter, when the first lighting device 60*a* and the second lighting device 60*b* are described without distinction, they may simply be referred to as a "lighting device 60".

Figure 4:
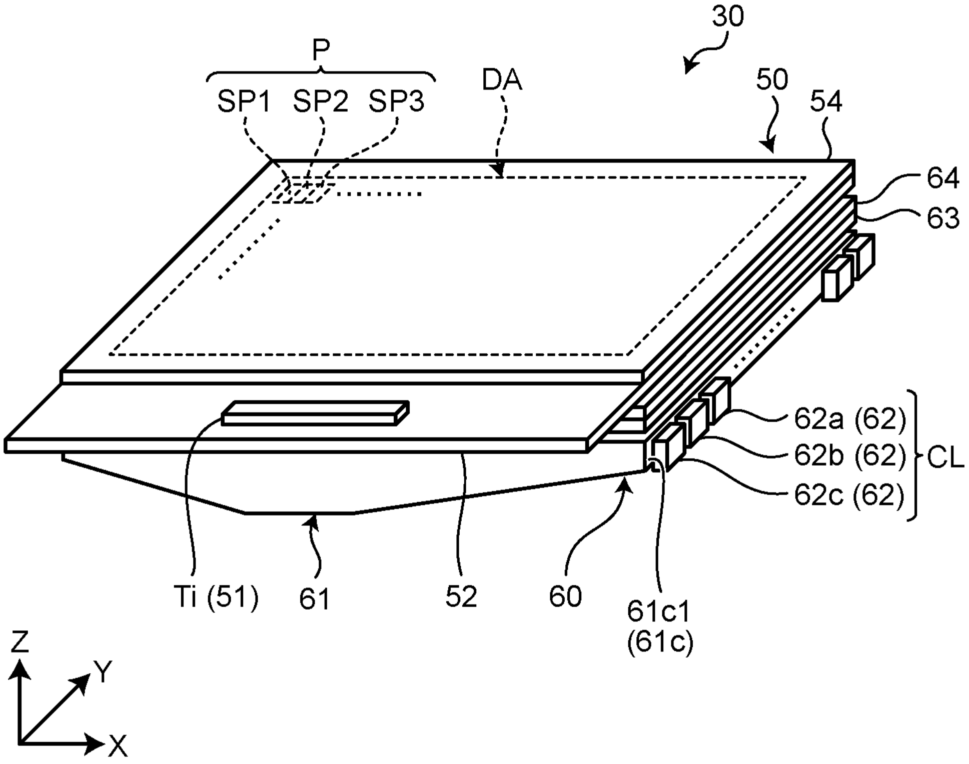
FIG. 4 is a perspective view of a display panel and a lighting device illustrated in FIG. 3.
Figure 5:
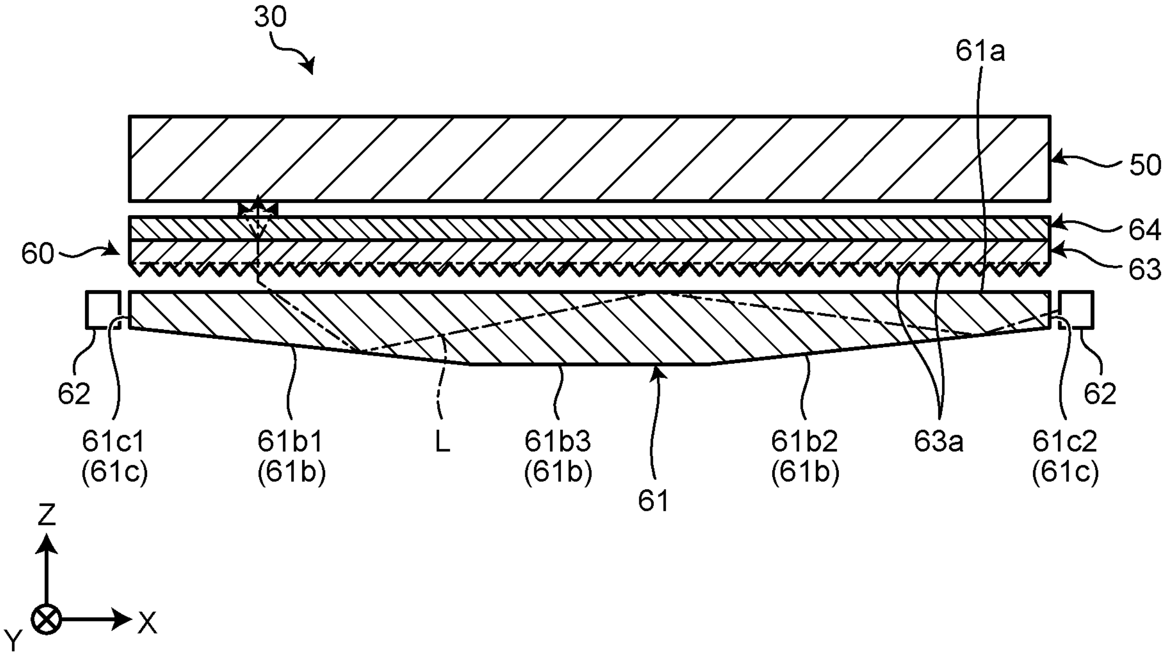
FIG. 5 is a sectional view of the display panel and the lighting device illustrated in FIG. 4.

FIG. 4 is a perspective view of the display panel 50 and the lighting device 60 illustrated in FIG. 3. FIG. 5 is a sectional view of the display panel 50 and the lighting device 60 illustrated in FIG. 4. The X and Y directions illustrated in the drawings correspond to directions parallel to a front surface of a substrate included in the display panel 50. The +X and −X sides in the X direction and the +Y and −Y sides in the Y direction correspond to the sides of the display panel 50. The Z direction corresponds to the thickness direction of the display panel 50 and is orthogonal to the X and Y directions. The +Z side in the Z direction corresponds to the front surface side of the display panel 50, and the −Z side in the Z direction corresponds to the rear surface side of the display panel 50. In the present specification, "plan view" refers to viewing the display panel 50 from the +Z side to the −Z side along the Z direction. The X, Y, and Z directions are examples, and the present disclosure is not limited to these directions.

As illustrated in FIG. 4, the display panel 50 is a rectangular plate in plan view and has, on the front surface thereof, the display region DA. The display panel 50 includes the pixels P aligned in a matrix (row-column configuration) along the X and Y directions in the display region DA.

The pixels P each have a first sub-pixel SP1, a second sub-pixel SP2, and a third sub-pixel SP3. The first sub-pixel SP1 is a red sub-pixel SP. The second sub-pixel SP2 is a green sub-pixel SP. The third sub-pixel SP3 is a blue sub-pixel SP. The first sub-pixel SP1, the second sub-pixel SP2 and the third sub-pixel SP3 are aligned in this order along the X direction. The array of the first sub-pixel SP1, the second sub-pixel SP2 and the third sub-pixel SP3 is what is called a stripe array.

Hereinafter, when the first sub-pixel SP1, the second sub-pixel SP2, and the third sub-pixel SP3 are described without distinction, they may simply be described as a "sub-pixel SP". Not to mention, the array of sub-pixels SP is not limited to a stripe array, and the colors of sub-pixels SP are not limited to the aforementioned colors.

Figure 6:
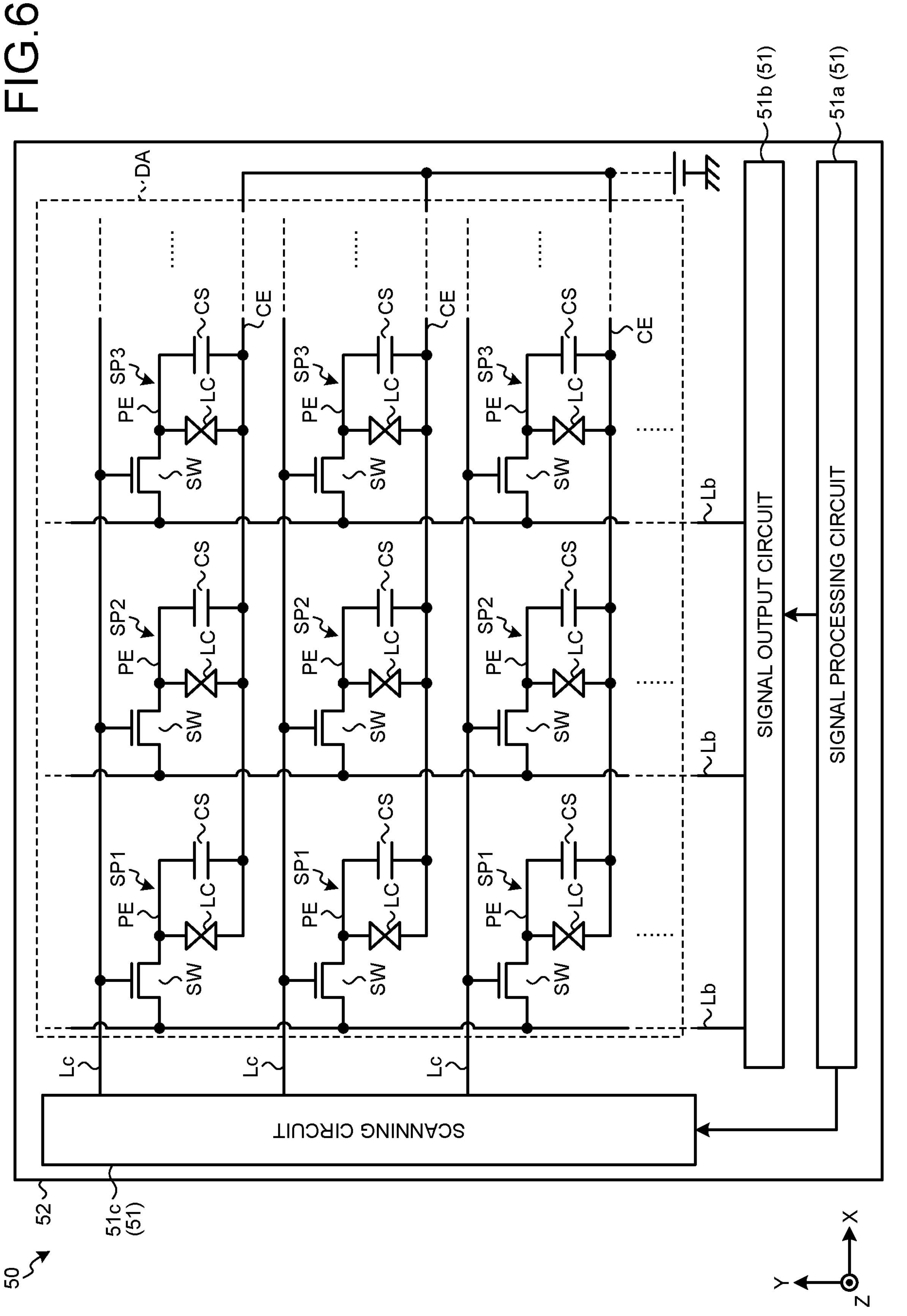
FIG. 6 is a view illustrating a circuit configuration of the display panel illustrated in FIG. 4.

FIG. 6 is a view illustrating a circuit configuration of the display panel 50 illustrated in FIG. 4. The display panel 50 includes a drive circuit 51, as well as a switching element SW, a pixel electrode PE, a common electrode CE, a liquid crystal capacitance LC, and a holding capacitance CS that are included in each of a plurality of the sub-pixels SP.

The drive circuit 51 drives the display panel 50 on the basis of image signals. The drive circuit 51 includes a signal processing circuit 51*a*, a signal output circuit 51*b*, and a scanning circuit 51*c*.

The signal processing circuit 51*a* generates sub-pixel signals, which will be described below, on the basis of image signals output from the image separation circuit 40, and outputs the generated sub-pixel signals to the signal output circuit 51*b*. The signal processing circuit 51*a* outputs clock signals to the signal output circuit 51*b* and the scanning circuit 51*c* to synchronize the operation of the signal output circuit 51*b* with that of the scanning circuit 51*c*.

The signal output circuit 51*b* outputs the sub-pixel signals to the corresponding sub-pixels SP. The signal output circuit 51*b* and the sub-pixels SP are electrically coupled through a plurality of signal lines Lb extending along the Y direction.

The scanning circuit 51*c* scans the sub-pixels SP in synchronization with the output of the sub-pixel signals by the signal output circuit 51*b*. The scanning circuit 51*c* and the sub-pixels SP are electrically coupled through a plurality of scanning lines Lc extending along the X direction. A region demarcated by two signal lines Lb adjacent to each other in the X direction and two scanning lines Lc adjacent to each other in the Y direction in plan view corresponds to a sub-pixel SP.

The switching element SW includes a thin-film transistor (TFT), for example. In the switching element SW, a source electrode is electrically coupled to the signal line Lb, and a gate electrode is electrically coupled to the scanning line Lc.

The pixel electrode PE is coupled to a drain electrode of the switching element SW. A plurality of the common electrodes CE are arranged corresponding to the scanning lines Lc. The pixel electrode PE and the common electrode CE are translucent.

The liquid crystal capacitance LC is a capacitive component of a liquid crystal material in a first liquid crystal layer 53, which will be described below, between the pixel electrode PE and the common electrode CE. The holding capacitance CS is placed between an electrode with the same potential as the common electrode CE and an electrode with the same potential as the pixel electrode PE.

Figure 7:
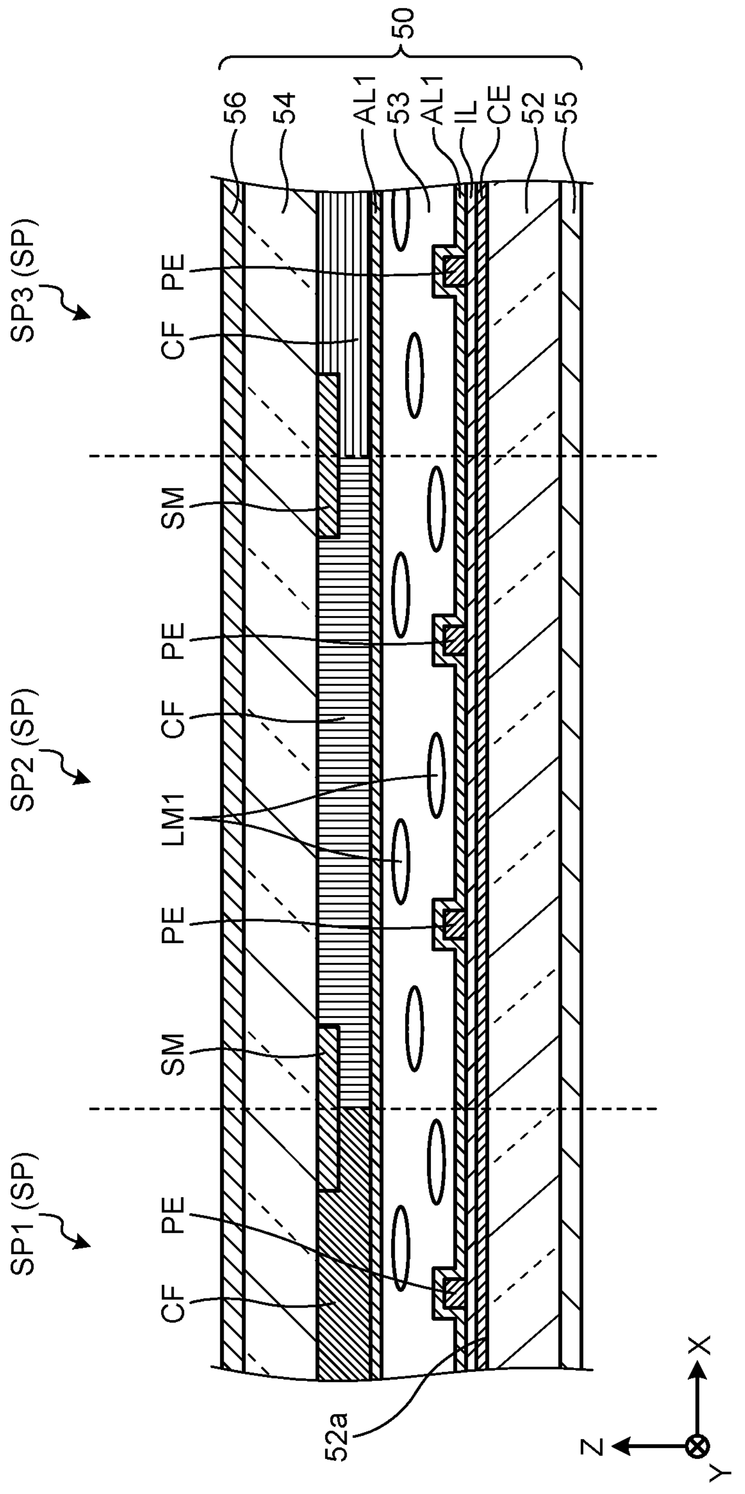
FIG. 7 is a sectional view of the display panel illustrated in FIG. 4.

FIG. 7 is a sectional view of the display panel 50 illustrated in FIG. 4. The display panel 50 further includes a first substrate 52, the first liquid crystal layer 53, and a second substrate 54. The first substrate 52, the first liquid crystal layer 53, and the second substrate 54 are all translucent and are aligned in this order along the Z direction from the −Z side to the +Z side. The first substrate 52 and the second substrate 54 are rectangular in plan view.

The common electrode CE is placed on a front surface 52*a* of the first substrate 52. An insulating layer IL is placed on the front surface of the common electrode CE, and the pixel electrode PE and a first orientation film AL1 are further placed on the front surface of the insulating layer IL. An IC chip Ti that is called a driver IC and that constitutes the drive circuit 51 is placed on the front surface of the first substrate 52 (see FIG. 4). The IC chip Ti includes the signal processing circuit 51*a*.

The pixel electrode PE is placed between the insulating layer IL and the first orientation film AL1. In this manner, the common electrode CE is placed on, and the pixel electrode PE is placed above the first substrate 52. In other words, the display panel 50 is a horizontal electric field type liquid crystal display. A mode may be such that a slit is provided in the common electrode CE for each pixel P and that the pixel electrode PE has a larger area than the slit.

The second substrate 54 is located on the front surface side of the first substrate 52. A color filter CF and a light-shielding film SM are placed on, and the first orientation film AL1 is placed under the rear surface of the second substrate 54. The light-shielding film SM and the color filter CF are placed between the second substrate 54 and the first orientation film AL1.

The color filter CF is rectangular in plan view and one color filter CF is placed for one sub-pixel SP. The color filter CF is translucent, and the peak of the spectrum of light to be transmitted is predetermined. The peak of the spectrum corresponds to the color of the color filter CF. The color of the color filter CF is the same as that of the sub-pixel SP. In other words, the red first sub-pixel SP1 has a red color filter CF, the green second sub-pixel SP2 has a green color filter CF, and the blue third sub-pixel SP3 has a blue color filter CF.

The range of wavelengths of light transmitted by the red color filter CF includes the range of wavelengths of a red laser beam to be described below. The range of wavelengths of light transmitted by the green color filter CF also includes the range of wavelengths of a green laser beam to be described below. Furthermore, the range of wavelengths of light transmitted by the blue color filter CF includes the range of wavelengths of a blue laser beam to be described below.

The light-shielding film SM is lightproof and overlaps in plan view the boundaries of the sub-pixels SP that are adjacent to each other in the X and Y directions. That is, the light-shielding film SM overlaps the signal line Lb and the scanning line Lc in plan view. In FIG. 6, the signal line Lb and the scanning line Lc are omitted. The signal lines Lb and the scanning lines Lc are placed on the front surface of the first substrate 52.

The first liquid crystal layer 53 includes a plurality of first liquid crystal molecules LM1. The first liquid crystal layer 53 is present between the first substrate 52 and the second substrate 54 and overlaps the display region DA in plan view. Specifically, the first liquid crystal layer 53 is present between two first orientation films AL1 facing each other. The orientation of the first liquid crystal molecules LM1 (orientation of the major axis of the first liquid crystal molecules LM1) is regulated by the two first orientation films AL1 facing each other.

The display panel 50 further includes a first polarizing plate 55 placed on the rear surface of the first substrate 52 and a second polarizing plate 56 placed on the front surface of the second substrate 54. The first polarizing plate 55 has a transmission axis orthogonal to the Z direction. The second polarizing plate 56 has a transmission axis orthogonal to the transmission axis of the first polarizing plate 55 and the Z direction. The front surface of the second polarizing plate 56 corresponds to the front surface of the display panel 50. The rear surface of the first polarizing plate 55 corresponds to the rear surface of the display panel 50.

As illustrated in FIG. 4, the lighting device 60 is placed on the rear surface side of the display panel 50 and illuminates the display panel 50. Specifically, the first lighting device 60*a* is placed on the rear surface side of the first display panel 50*a*, and the second lighting device 60*b* is placed on the rear surface side of the second display panel 50*b*. In other words, the first lighting device 60*a* illuminates the first display panel 50*a*. The second lighting device 60*b* illuminates the second display panel 50*b*. The lighting device 60 emits light toward the display panel 50.

As illustrated in FIGS. 4 and 5, the lighting device 60 includes a light-guiding plate 61, a plurality of first light-emitting elements 62*a*, a plurality of second light-emitting elements 62*b*, a plurality of third light-emitting elements 62*c*, a prism sheet 63, and a diffusion sheet 64. Hereinafter, when the first light-emitting element 62*a*, the second light-emitting element 62*b*, and the third light-emitting element 62*c* are described without distinction, they may simply be referred to as a "light-emitting element 62".

The light-guiding plate 61, the prism sheet 63, and the diffusion sheet 64 are aligned in this order along the Z direction from the −Z side to the +Z side in the lighting device 60. The light-emitting elements 62 are arranged at the side of the light-guiding plate 61.

Figure 8:
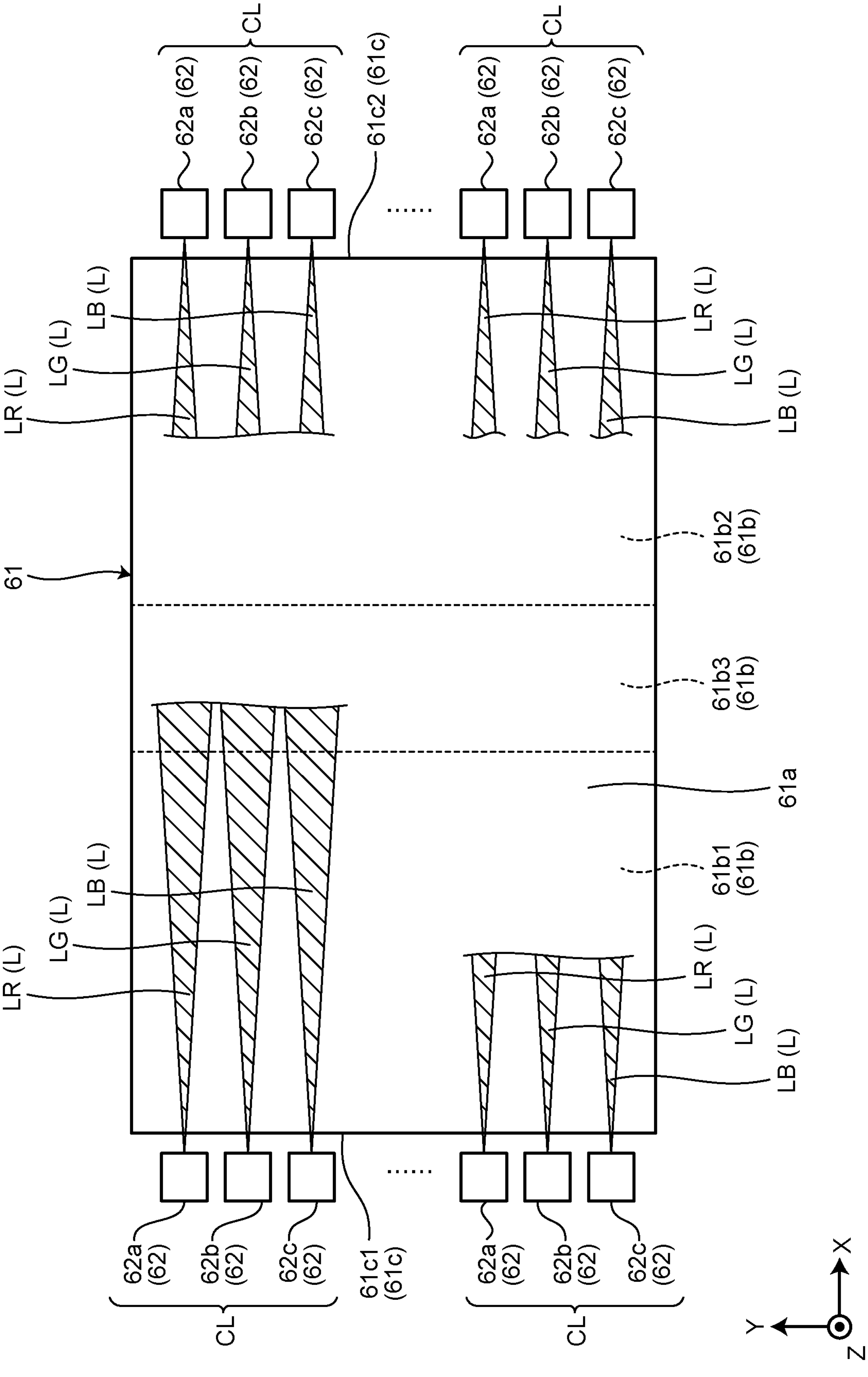
FIG. 8 is a plan view of a light-guiding plate and a plurality of light-emitting elements illustrated in FIG. 4.

FIG. 8 is a plan view of the light-guiding plate 61 and the light-emitting elements 62 illustrated in FIG. 4. The light-guiding plate 61 is rectangular in plan view. The light-guiding plate 61 has plane symmetry with respect to a plane passing through the center of the light-guiding plate 61 and orthogonal to the X direction.

As illustrated in FIGS. 5 and 8, a front surface 61*a* of the light-guiding plate 61 is a plane orthogonal to the Z direction. Light is emitted from the front surface 61*a* of the light-guiding plate 61 toward the display panel 50. A rear surface 61*b* of the light-guiding plate 61 has a first inclined surface 61*b*1, a second inclined surface 61*b*2, and a coupling surface 61*b*3.

The first inclined surface 61*b*1 is on the −X side of the rear surface 61*b* and is a plane having an inclination toward the −Z side along the Z direction as the inclination tends toward the +X side along the X direction. The second inclined surface 61*b*2 is on the +X side of the rear surface 61*b* and is a plane having an inclination toward the −Z side along the Z direction as the inclination tends toward the −X side along the X direction.

The coupling surface 61*b*3 couples the first inclined surface 61*b*1 and the second inclined surface 61*b*2 at the central portion of the rear surface 61*b* in the X direction. In other words, the coupling surface 61*b*3 is on the +X side of the first inclined surface 61*b*1 and is continuous with the first inclined surface 61*b*1. The coupling surface 61*b*3 is on the −X side of the second inclined surface 61*b*2 and is continuous with the second inclined surface 61*b*2. The coupling surface 61*b*3 is a plane parallel to the front surface 61*a*.

A first side surface 61*c*1 on the −X side of the light-guiding plate 61 is a plane orthogonal to the X direction and couples the first inclined surface 61*b*1 and the front surface 61*a*. A second side surface 61*c*2 on the +X side of the light-guiding plate 61 is a plane orthogonal to the X direction and couples the second inclined surface 61*b*2 and the front surface 61*a*. Hereinafter, when the first side surface 61*cl* and the second side surface 61*c*2 are described without distinction, they may simply be described as a "side surface 61*c*".

The light-emitting elements 62 emit light toward the side surface 61*c*. The light emitted by the light-emitting elements 62 is a laser beam. Colors of laser beams emitted by the light-emitting elements 62 are different from each other. Specifically, as illustrated in FIG. 8, the first light-emitting elements 62*a* emit red first laser beams LR. The second light-emitting elements 62*b* emit green second laser beams LG. The third light-emitting elements 62*c* emit blue third laser beams LB.

Hereinafter, when the red first laser beam LR, the green second laser beam LG, and the blue third laser beam LB are described without distinction, they may simply be described as a "laser beam L". FIG. 5 illustrates the laser beams L in plan view of the light-guiding plate 61. In this manner, the colors of the laser beams L emitted by the light-emitting elements 62 correspond to the colors of the sub-pixels SP (that is, the colors of the color filters), in this first embodiment. Not to mention, the number of types of the light-emitting elements 62 is not limited to three. For example, the lighting device 60 may further include a fourth light-emitting element that emits a laser beam L in a color different from red, green, and blue.

The light-emitting elements 62 are arranged in a state of facing the side surfaces 61*c* of the light-guiding plate 61. The light-emitting elements 62 are arranged along the Y direction. Specifically, one first light-emitting element 62*a*, one second light-emitting element 62*b*, and one third light-emitting element 62*c* aligned along the Y direction constitute one set of light-emitting elements CL, and a plurality of sets of the light-emitting elements CL are aligned along the Y direction.

As illustrated by the dash-dotted line arrows in FIG. 5, the laser beam L emitted from one set of the light-emitting element 62 facing the second side surface 61*c*2 enters the light-guiding plate 61 from the second side surface 61*c*2, repeats total reflection at the rear surface 61*b* and the front surface 61*a*, and then is emitted from the front surface 61*a*. The laser beam L (not illustrated) emitted from one set of the light-emitting element 62 facing the first side surface 61*cl* enters the light-guiding plate 61 from the first side surface 61*c*1, repeats total reflection at the rear surface 61*b* and the front surface 61*a*, and then is emitted from the front surface 61*a*.

In other words, the inclination angles of the first inclined surface 61*b*1 and the second inclined surface 61*b*2 are defined as the angles at which the laser beam L is emitted from the front surface 61*a*. The laser beams L from the light-emitting elements 62 interfere with each other by repeating total reflection in the light-guiding plate 61, resulting in the color of the light emitted from the light-guiding plate 61 being white.

The prism sheet 63 illustrated in FIG. 5 refracts the light emitted from the light-guiding plate 61 in a direction in which the optical axis of the light is along the Z direction. The prism sheet 63 has a plurality of prisms 63*a* that are triangular in section and that extend along the Y direction in a state of facing the light-guiding plate 61. The prisms 63*a* may be placed in a state of facing the diffusion sheet 64. The light emitted from the prism sheet 63 enters the diffusion sheet 64.

The diffusion sheet 64 diffuses the light emitted from the prism sheet 63. The light emitted from the diffusion sheet 64 enters the display panel 50. The viewing angle of the display panel 50 can be increased by diffusing the light with the diffusion sheet 64.

The dash-dotted line arrows in FIG. 5 indicate the path of the laser beam L emitted from the light-emitting element 62, which, after being reflected in the light-guiding plate 61, is emitted from the light-guiding plate 61, refracted by the prism sheet 63, diffused by the diffusion sheet 64, and enters the display panel 50. Not to mention, the path of the laser beam L is not limited to that illustrated by the dash-dotted line arrows in FIG. 5.

The light emitted from the diffusion sheet 64 passes through the display panel 50. In the display panel 50, the aforementioned drive circuit 51 outputs, to the sub-pixels SP, sub-pixel signals generated on the basis of the image signals. With this operation, voltages corresponding to the sub-pixel signals are applied to the sub-pixels SP and an electric field is generated in the first liquid crystal layer 53, thereby changing the orientation of the first liquid crystal molecules LM1 and adjusting the translucency of the first liquid crystal layer 53. The light emitted from the lighting device 60 and transmitted through the display panel 50 is modulated, to display an image on the display region DA.

The lighting device 60 further includes a light control circuit 65 illustrated in FIG. 3. The light control circuit 65 controls the lighting device 60. The signal processing circuit 51*a* of the aforementioned drive circuit 51 generates light source signals on the basis of the image signals output from the image separation circuit 40, and outputs the generated light source signals to the light control circuit 65. Furthermore, the signal processing circuit 51*a* outputs the aforementioned clock signals to the light control circuit 65. The clock signals synchronize the operation of the light control circuit 65 with that of the signal output circuit 51*b* and that of the scanning circuit 51*c*. The light control circuit 65 controls the light-emitting elements 62 on the basis of the light source signals.

Figure 9:
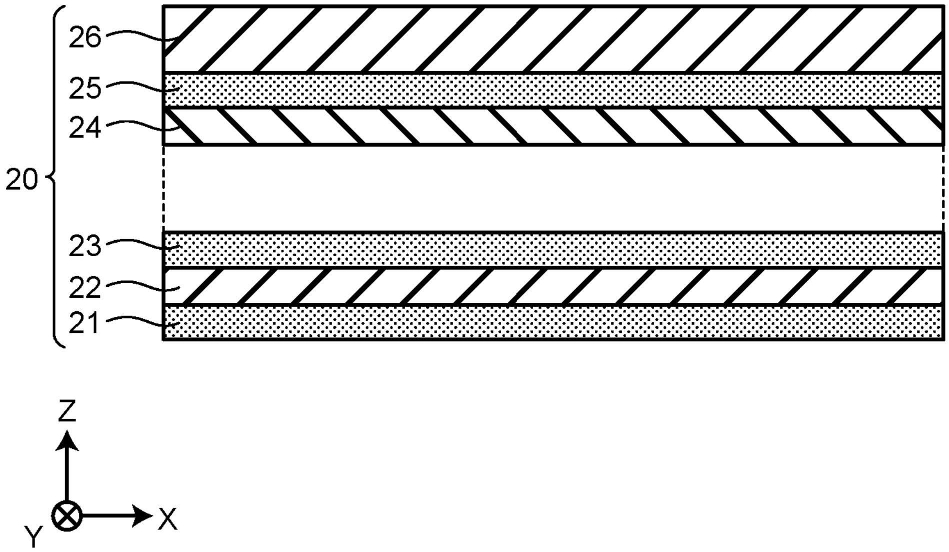
FIG. 9 is a sectional view of an optical element illustrated in FIG. 2.

FIG. 9 is a sectional view of the optical element 20 illustrated in FIG. 2. The two optical elements 20 have the same configuration as each other. The optical element 20 has a lens action that allows the user to view an image displayed in the display region DA in an enlarged state. The optical element 20 collects the light transmitted through the display panel 50 and emitted from the display panel 50 (hereinafter, it may be referred to as "emitted light") to the user's eyes E.

One optical element 20 of the two optical elements 20 is present between the first display panel 50*a* and the user's left eye, and collects the light transmitted through the first display panel 50*a* to the user's left eye. The other optical element 20 of the two optical elements 20 is present between the second display panel 50*b* and the user's right eye, and collects the light transmitted through the second display panel 50*b* to the user's right eye.

The optical element 20 includes a first phase difference plate 21, a transflective layer 22, a second phase difference plate 23, a reflective polarizing plate 24, a third phase difference plate 25, and a liquid crystal element 26. The first phase difference plate 21, the transflective layer 22, the second phase difference plate 23, the reflective polarizing plate 24, the third phase difference plate 25, and the liquid crystal element 26 are larger than the display region DA in plan view and overlap the display region DA.

The first phase difference plate 21, the transflective layer 22, the second phase difference plate 23, the reflective polarizing plate 24, the third phase difference plate 25, and the liquid crystal element 26 are aligned in this order along the Z direction from the −Z side to the +Z side. The first phase difference plate 21 is placed apart from the display panel 50. The first phase difference plate 21 may be in contact with the front surface of the display panel 50.

The first phase difference plate 21 and the transflective layer 22, as well as the transflective layer 22 and the second phase difference plate 23, are stacked in close contact with each other. The second phase difference plate 23 and the reflective polarizing plate 24 are placed apart from each other. That is, there is an air layer between the second phase difference plate 23 and the reflective polarizing plate 24. The reflective polarizing plate 24 and the third phase difference plate 25, as well as the third phase difference plate 25 and the liquid crystal element 26, are stacked in close contact with each other.

The first phase difference plate 21, the second phase difference plate 23, and the third phase difference plate 25 are quarter-wave plates. Light transmitted through the first phase difference plate 21, the second phase difference plate 23, and the third phase difference plate 25 is given a phase difference of one-quarter wavelength of the light.

The transflective layer 22 is a thin film made of metal (e.g., aluminum and silver). Part of the light entering the transflective layer 22 passes through the transflective layer 22, while another part of the light entering the transflective layer 22 is reflected without passing through the transflective layer 22.

The reflective polarizing plate 24 is a polarizing plate that transmits first linearly polarized light, which is linearly polarized light having a polarization direction parallel to the transmission axis of the second polarizing plate 56 included in the display panel 50, and that reflects second linearly polarized light, which is linearly polarized light orthogonal to the first linearly polarized light.

The liquid crystal element 26 has a lens action that collects circularly polarized light to the user's eyes E. The light transmitted through the liquid crystal element 26 is given a phase difference of one-half wavelength of the light.

Figure 10:
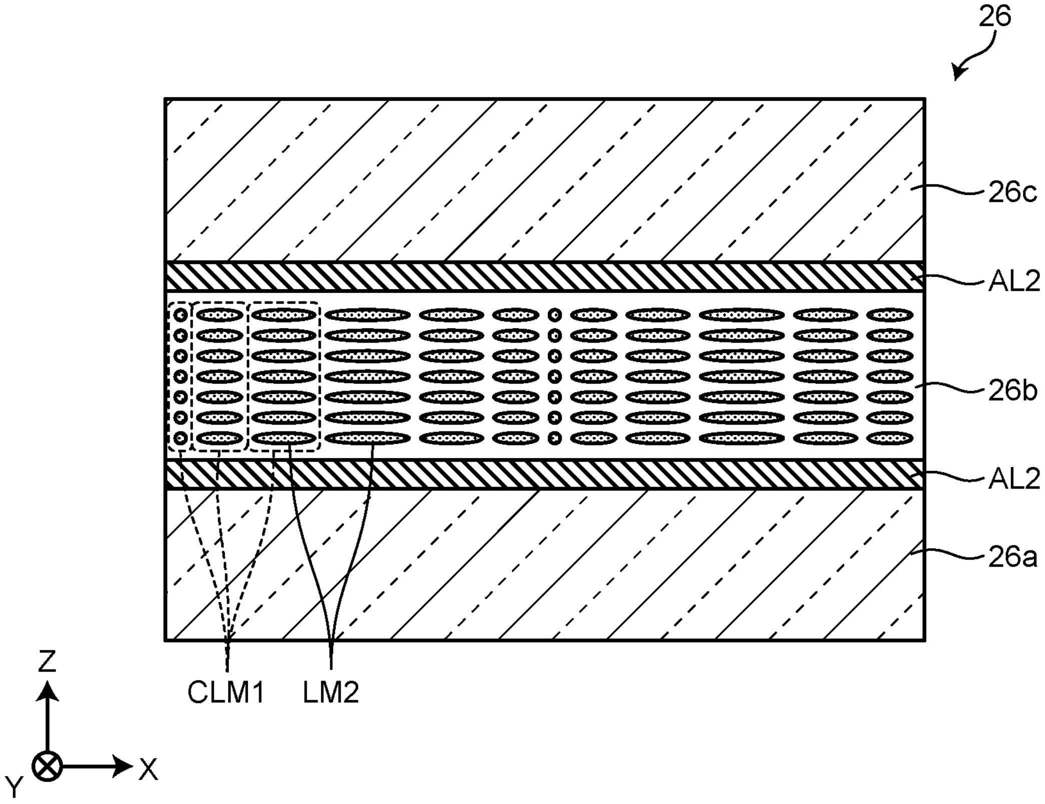
FIG. 10 is a sectional view of a liquid crystal element.

FIG. 10 is a sectional view of the liquid crystal element 26. The liquid crystal element 26 further includes a third substrate 26*a*, a second liquid crystal layer 26*b*, and a fourth substrate 26*c*. The third substrate 26*a*, the second liquid crystal layer 26*b*, and the fourth substrate 26*c* are all translucent and are aligned in this order along the Z direction from the −Z side to the +Z side. The third substrate 26*a* and the fourth substrate 26*c* are rectangular in plan view.

A second orientation film AL2 is placed both on the front surface of the third substrate 26*a* and on the rear surface of the fourth substrate 26*c*. The second liquid crystal layer 26*b* is placed between two second orientation films AL2 in the Z direction. The second liquid crystal layer 26*b* has a nematic liquid crystal.

The second liquid crystal layer 26*b* includes a plurality of second liquid crystal molecules LM2. The orientation of the second liquid crystal molecules LM2 (orientation of the major axis of the second liquid crystal molecules LM2) is regulated by the two second orientation films AL2 facing each other. Specifically, the orientation of the major axis of the second liquid crystal molecules LM2 is regulated as follows.

Figure 11:
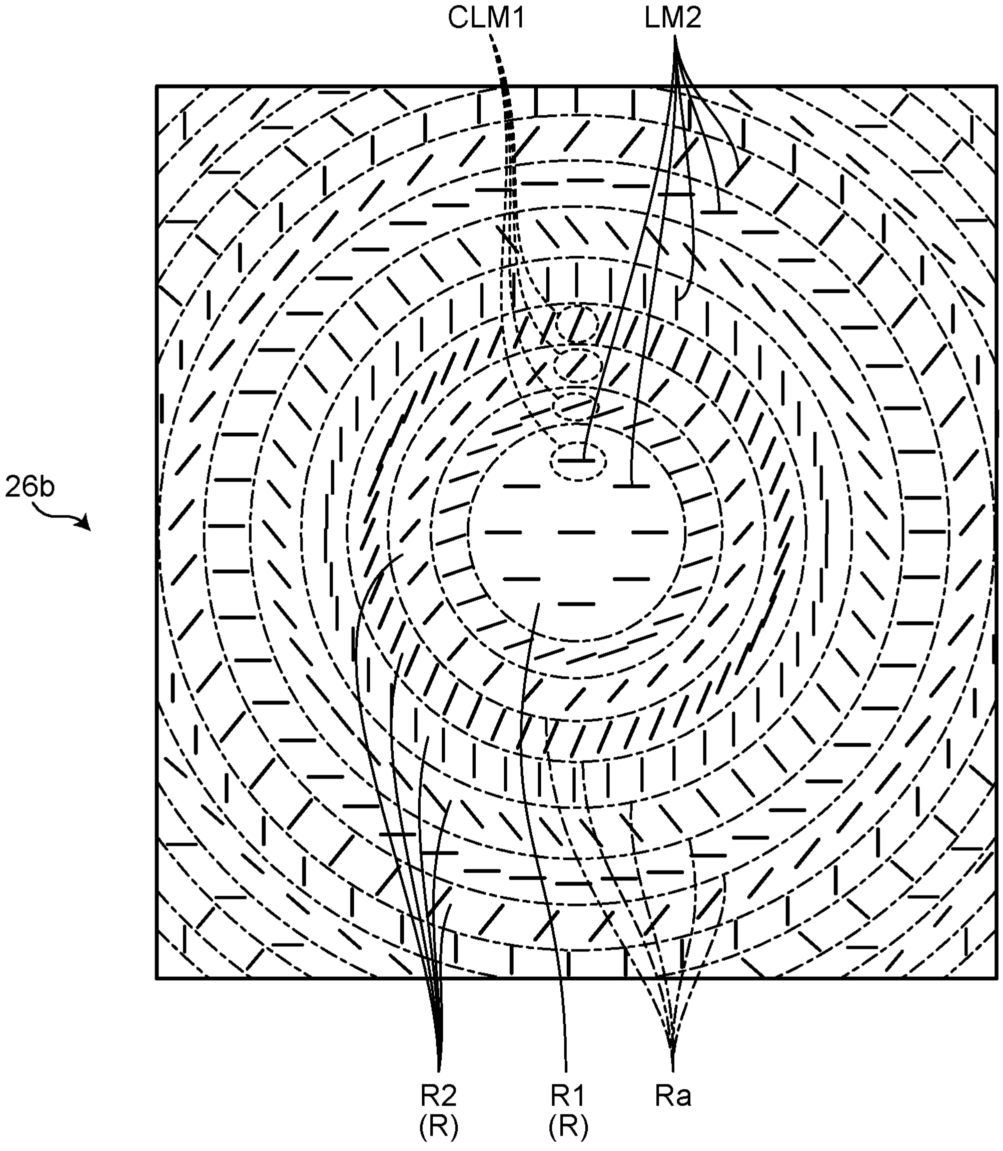
FIG. 11 is a plan view of a second liquid crystal layer.

FIG. 11 is a plan view of the second liquid crystal layer 26*b*. The second liquid crystal layer 26*b* is demarcated into a plurality of regions R by a plurality of boundaries Ra in plan view. The boundaries Ra are concentric circles with diameters different from each other in plan view. The regions R include a central region R1 that is circular in plan view and a plurality of annular regions R2 that are circular in plan view, that surround the central region R1, and that have sizes different from each other. The central region R1 overlaps the center of the display region DA of the display panel 50 in plan view and faces the user's eyes E.

As illustrated in FIGS. 10 and 11, the regions R each include a plurality of sets of second liquid crystal molecules CLM1, each of which includes the second liquid crystal molecules LM2 aligned along the Z direction. As illustrated in FIG. 10, the orientation of the major axis of the second liquid crystal molecules LM2 is orthogonal to the Z direction in each of the regions R.

As illustrated in FIG. 11, the orientations of the major axes of the second liquid crystal molecules LM2 included in the same region R are parallel to each other in plan view in each of the regions R.

The orientations of the major axes of the second liquid crystal molecules LM2 are different from each other in plan view in two regions R adjacent to each other in the radial direction of the boundary Ra in plan view. Specifically, in plan view, the orientation of the major axis of the second liquid crystal molecules LM2 is rotated in the direction around the Z axis (counterclockwise in plan view) with tending from the central region R1 to the radial direction outside of the boundaries Ra.

In this first embodiment, the orientation of the major axes of the second liquid crystal molecules LM2 included in the central region R1 is along the X direction in plan view. The angle in the direction around the Z axis between the major axis of the second liquid crystal molecules LM2 included in the central region R1 and the major axes of the second liquid crystal molecules LM2 included in the annular regions R2 is larger in the annular region R2 that is farther from the central region R1 in the radial direction outside of the central region R1.

The orientation of the second liquid crystal molecules LM2 is regulated in this manner, so that the liquid crystal element 26 (optical element 20) has the lens action. The emitted light transmitted through the display panel 50 travels through the optical element 20 configured as described above, as follows.

Figure 12:
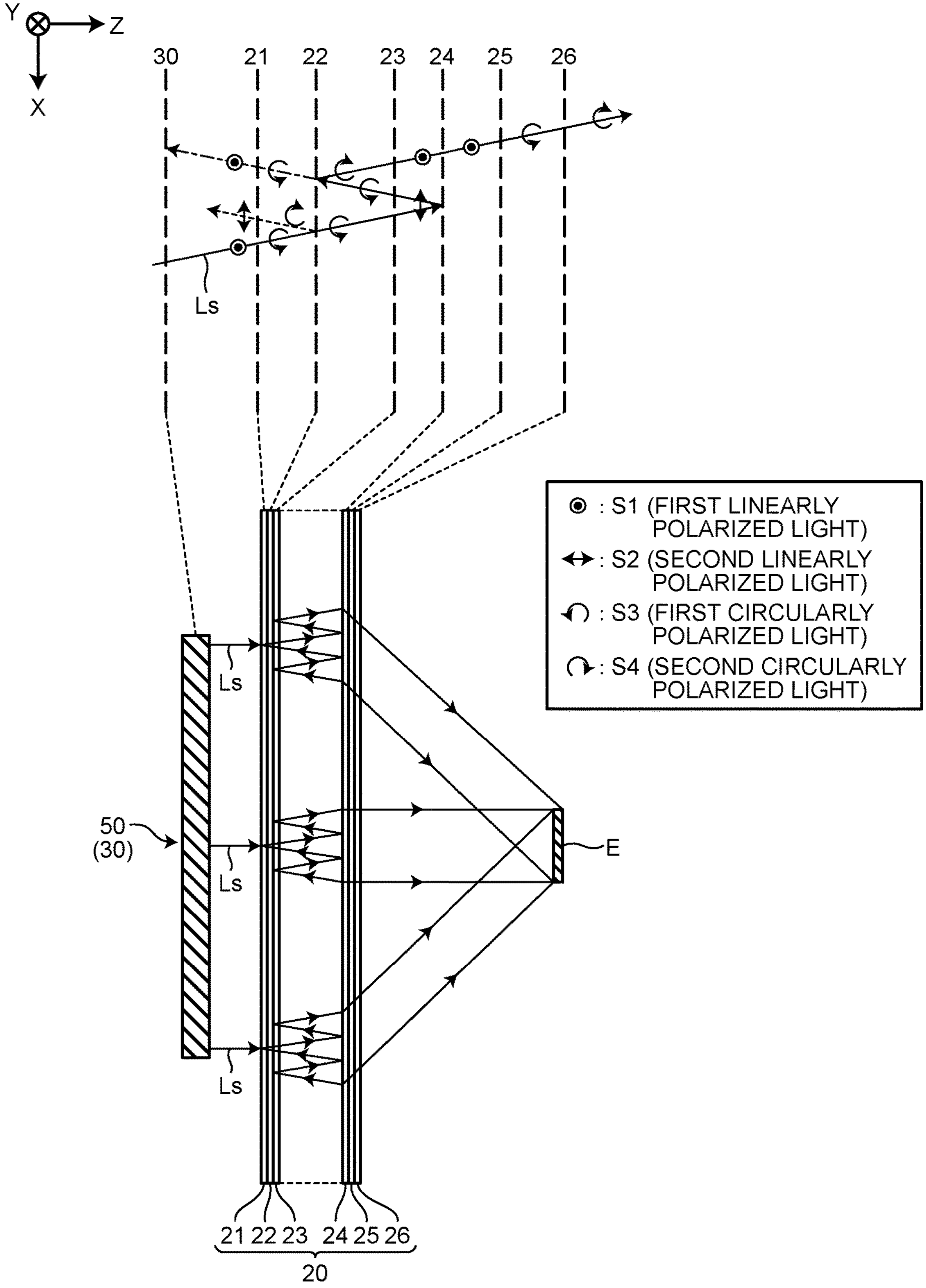
FIG. 12 is a view illustrating a lens action of the optical element illustrated in FIG. 9.

FIG. 12 is a view illustrating the lens action of the optical element 20 illustrated in FIG. 9. Emitted light Ls emitted from the display panel 50 toward the +Z side enters the optical element 20. The emitted light Ls emitted from the display panel 50 corresponds to the aforementioned first linearly polarized light. In this first embodiment, the first linearly polarized light is linearly polarized light having a polarization direction along the Y direction. FIG. 12 illustrates a symbol S1 indicating the polarization direction of the first linearly polarized light.

The emitted light Ls first passes through the first phase difference plate 21. As a result, the emitted light Ls is converted to the first circularly polarized light by being given a phase difference of one-quarter wavelength. In this first embodiment, the first circularly polarized light is circularly polarized light that rotates counterclockwise when the emitted light Ls is viewed from the front side of the traveling direction along the traveling direction of the emitted light Ls. In other words, the first circularly polarized light is rotated counterclockwise in plan view. FIG. 12 illustrates a symbol S3 indicating the polarization direction of the first circularly polarized light.

Part of the emitted light Ls transmitted through the first phase difference plate 21 is reflected by the transflective layer 22. The emitted light Ls reflected by the transflective layer 22 (illustrated by the dashed line in FIG. 12) is converted to second circularly polarized light. The second circularly polarized light is circularly polarized light having a rotational direction opposite to that of the first circularly polarized light. Specifically, the second circularly polarized light is circularly polarized light that rotates clockwise when the emitted light Ls is viewed from the front side of the traveling direction along the traveling direction of the emitted light Ls. FIG. 12 illustrates a symbol S4 indicating the polarization direction of the second circularly polarized light.

The emitted light Ls reflected by the transflective layer 22 is converted to the second linearly polarized light by passing through the first phase difference plate 21. The second linearly polarized light is linearly polarized light having a polarization direction orthogonal to the polarization direction of the first linearly polarized light. In this first embodiment, the second linearly polarized light has a polarization direction along the X direction. FIG. 12 illustrates a symbol S2 indicating the polarization direction of the second linearly polarized light. The emitted light Ls reflected by the transflective layer 22 and transmitted through the first phase difference plate 21 is absorbed by the display panel 50.

On the contrary, another part of the emitted light Ls transmitted through the first phase difference plate 21 passes through the transflective layer 22. The emitted light Ls transmitted through the transflective layer 22 corresponds to the first circularly polarized light. Furthermore, the emitted light Ls transmitted through the transflective layer 22 passes through the second phase difference plate 23. The emitted light Ls transmitted through the second phase difference plate 23 is converted to the second linearly polarized light by being given a phase difference of one-quarter wavelength.

The emitted light Ls transmitted through the second phase difference plate 23 corresponds to the second linearly polarized light and thus is reflected by the reflective polarizing plate 24. The emitted light Ls reflected by the reflective polarizing plate 24 remains the second linearly polarized light. The emitted light Ls reflected by the reflective polarizing plate 24 passes through the second phase difference plate 23.

The emitted light Ls transmitted through the second phase difference plate 23 is converted to the first circularly polarized light. Part of the emitted light Ls transmitted through the second phase difference plate 23 passes through the transflective layer 22. The emitted light Ls transmitted through the transflective layer 22 (illustrated by the dash-dotted line in FIG. 12) corresponds to the first circularly polarized light. The emitted light Ls transmitted through the transflective layer 22 passes through the first phase difference plate 21 and is converted to the first linearly polarized light.

On the other hand, still another part of the emitted light Ls reflected by the reflective polarizing plate 24 and transmitted through the second phase difference plate 23 is reflected by the transflective layer 22. The emitted light Ls reflected by the transflective layer 22 is converted to the second circularly polarized light. The emitted light Ls reflected by the transflective layer 22 is converted to the first linearly polarized light by passing through the second phase difference plate 23.

The emitted light Ls transmitted through the second phase difference plate 23 corresponds to the first linearly polarized light and thus passes through the reflective polarizing plate 24. The emitted light Ls transmitted through the reflective polarizing plate 24 remains the first linearly polarized light.

The emitted light Ls transmitted through the reflective polarizing plate 24 passes through the third phase difference plate 25. The emitted light Ls transmitted through the third phase difference plate 25 is converted to the first circularly polarized light by being given a phase difference of one-quarter wavelength. The emitted light Ls transmitted through the third phase difference plate 25 passes through the liquid crystal element 26.

The emitted light Ls passing through the liquid crystal element 26 is converted to the second circularly polarized light and also refracted in the direction toward the user's eyes E. As a result, the emitted light Ls is collected to the user's eyes E. In this manner, the lens action of the optical element 20 allows the user to view an image displayed in the display region DA in an enlarged state.

As described above, the emitted light Ls is reflected a plurality of times in the optical element 20 and is then collected to the user's eyes E, thereby enabling a shorter focal length than a lens made of glass or resin, for example. Thus, the optical element 20 can be made thinner and lighter.

The image viewed by the user through the optical element 20 is distorted. In other words, the optical element 20 causes distortion. Specifically, the image viewed by the user through the optical element 20 has distortion that makes the central portion of the image appear bulging relative to the image displayed in the display region DA. In other words, in the distortion caused by the optical element 20, the degree of distortion toward the center of the image displayed in the display region DA increases with distance from the center of the image. To address this, the drive circuit 51 suppresses the distortion generated by the optical element 20, as described next.

Figure 13:
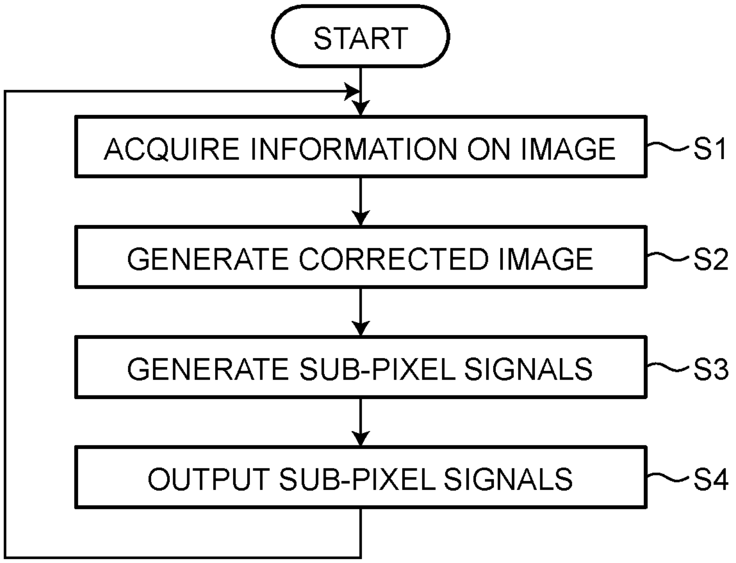
FIG. 13 is a flowchart executed by a drive circuit of the first embodiment.

FIG. 13 is a flowchart executed by the drive circuit 51 of the first embodiment. The drive circuit 51 acquires information on an image at step S1. The information on an image is included in an image signal transmitted from the external device.

Subsequently, the drive circuit 51 generates a corrected image obtained by applying correction to the image included in the image signal to cause distortion, on the basis of the distortion caused by the optical element 20, at step S2. The drive circuit 51 first transforms a coordinate system of the image included in the image signal on the basis of the distortion caused by the optical element 20.

Figure 14:
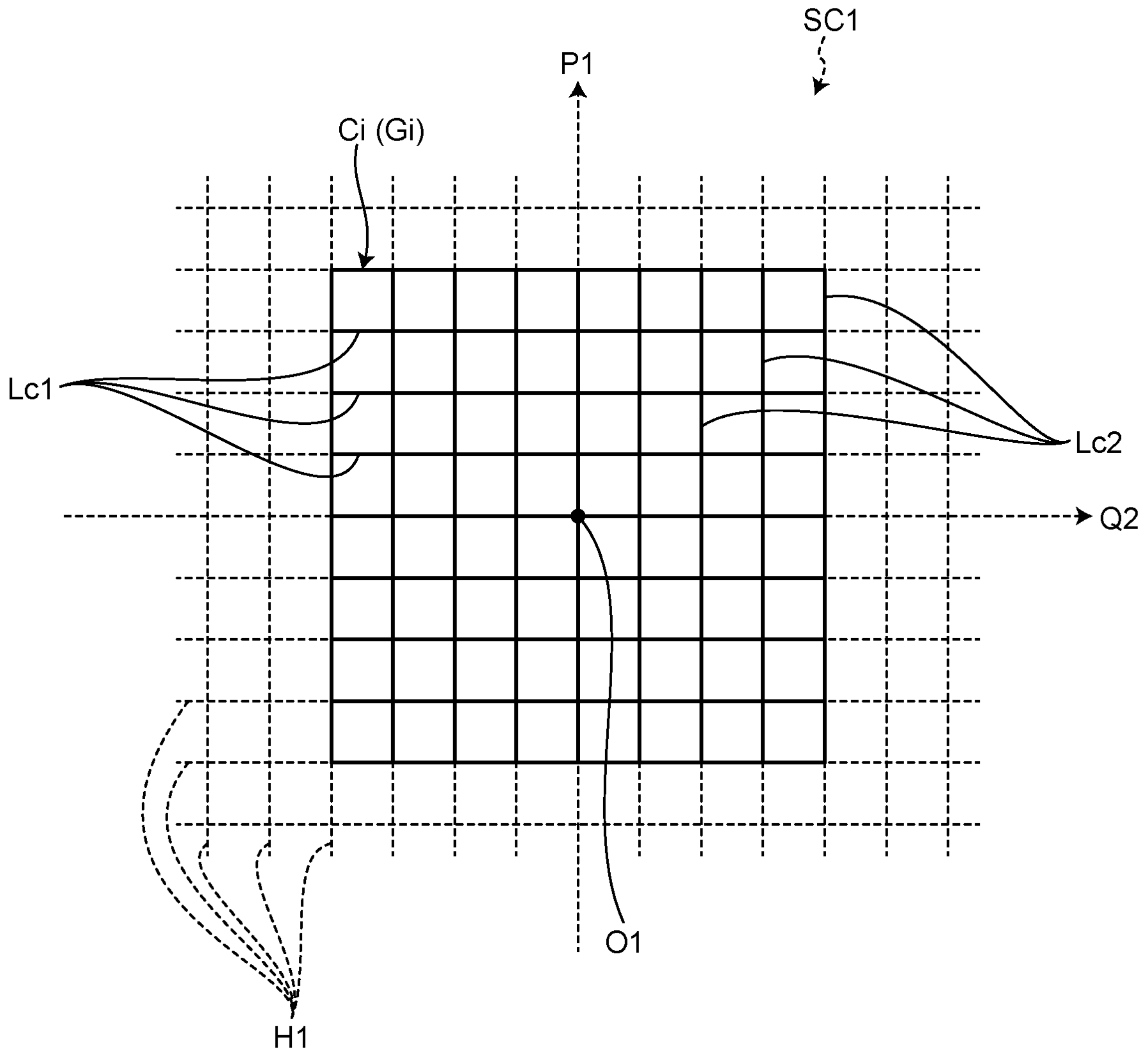
FIG. 14 is a view illustrating an image included in an image signal and a coordinate system of the image.

FIG. 14 is a view illustrating an image included in an image signal and a coordinate system of the image. FIG. 14 illustrates a solid line portion Ci that includes black solid lines, of the image included in the image signal (hereinafter, it may be referred to as an input image Gi). The solid line portion Ci is square demarcated by a plurality of first straight lines Lc1 and a plurality of second straight lines Lc2 that are all equally spaced. The first straight line Lc1 and the second straight line Lc2 are orthogonal to each other. Sections other than the solid line portion Ci are white in the input image Gi.

Gradation values of the sub-pixels SP corresponding to the input image Gi are included in the image signal. Specifically, the gradation value of the red first sub-pixel SP1 corresponds to the red gradation value included in the image signal, the gradation value of the green second sub-pixel SP2 corresponds to the red gradation value included in the image signal, and the gradation value of the blue third sub-pixel SP3 corresponds to the blue gradation value included in the image signal.

The coordinate system of the input image Gi (hereinafter, it may be referred to as an input coordinate system CS1) is a rectangular coordinate system in which coordinate axes, a first P axis P1 and a first Q axis Q1, are orthogonal to each other, and an origin O1 of the input coordinate system CS1 is at the center of the input image Gi. The origin O1 aligns with the center of the solid line portion Ci. The input coordinate system CS1 illustrated in FIG. 14 indicates a plurality of additional lines H1 that are parallel to one of the first P axis P1 and the first Q axis Q1 and that are equally spaced.

Part of the first P axis P1, the first Q axis Q1, and the additional lines H1 overlap the solid line portion Ci. In the input coordinate system CS1, the first P axis P1, the first Q axis Q1, and the additional lines H1 that overlap the input image Gi are illustrated by solid lines, while the first P axis P1, the first Q axis Q1, and the additional lines H1 that do not overlap the input image Gi are illustrated by dashed lines.

The drive circuit 51 first transforms the size of the input coordinate system CS1 with the origin O1 as a reference point by using equations (1) and (2). The size-transformed coordinate system (not illustrated) is a rectangular coordinate system in which a second P axis corresponding to the first P axis P1 and a second Q axis corresponding to the first Q axis Q1 are orthogonal to each other.

$$p2 = p1 \times Cp1 \tag{1}$$

$$q2 = q1 \times Cq1 \tag{2}$$

In equation (1), p1 is a coordinate of the first P axis P1 in the input coordinate system CS1, p2 is a coordinate of the second P axis in the coordinate system the size of which has been transformed, and Cp1 is a coefficient indicating a given value. In equation (2), q1 is a coordinate of the first Q axis Q1 in the input coordinate system CS1, q2 is a coordinate of the second Q axis in the coordinate system the size of which has been transformed, and Cq1 is a coefficient indicating a given value. The values of Cp1 and Cq1 are at which the corrected image does not become distorted or crushed with respect to the input image Gi, and are adjusted by an experiment or simulation conducted in advance.

Subsequently, the drive circuit 51 performs distortion processing to distort the coordinate system the size of which has been transformed, on the basis of the distortion caused by the optical element 20. The distortion processing causes the same distortion as the distortion caused by the optical element 20 for the coordinate system the size of which has been transformed, with the origin O1 as a reference point.

As described above, in the distortion caused by the optical element 20, the degree of distortion toward the center of the image displayed in the display region DA increases with distance from the center of the image. To address this, the distortion processing moves a given point in the aforementioned size-transformed coordinate system in the direction closer to the origin, and the amount of movement of the given point in the direction closer to the origin is increased as the given point is farther from the origin.

Specifically, the drive circuit 51 performs distortion processing by using equations (3), (4), and (5). The coordinate system on which the distortion processing was performed (not illustrated) is a rectangular coordinate system in which a third P axis corresponding to the second P axis and a third Q axis corresponding to the second Q axis are orthogonal to each other.

$$p3 = p2 \times (1 - k1 \times r^2 - k2 \times r^4 - k3 \times r^6) \tag{3}$$

$$p3 = p2 \times (1 - k1 \times r^2 - k2 \times r^4 - k3 \times r^6) \tag{4}$$

$$r^2 = p2^2 + q2^2 \tag{5}$$

In equations (3), (4), and (5), p3 is a coordinate of the third P axis in the coordinate system on which the distortion processing was performed, q3 is a coordinate of the third Q axis in the coordinate system on which the distortion processing was performed, and k1, k2, and k3 are coefficients indicating given values and are positive values. The values of k1, k2, and k3 are determined by the distortion by the optical element 20, and are adjusted by an experiment or simulation conducted in advance.

Furthermore, the drive circuit 51 generates a coordinate system the size of which has been transformed and on which the distortion processing was performed by using equations (6) and (7) (hereinafter, it may be referred to as a transformed coordinate system CS4 (see FIG. 15 to be described below)). The transformed coordinate system CS4 is a rectangular coordinate system in which a fourth P axis P4 corresponding to the third P axis and a fourth Q axis Q4 corresponding to the third Q axis are orthogonal to each other.

$$p4 = p3 \times Cp2 \quad (6)$$

$$q4 = q3 \times Cq2 \quad (7)$$

In equation (6), p4 is a coordinate of the fourth P axis P4 in the transformed coordinate system CS4 the size of which has been transformed, and Cp2 is a coefficient indicating a given value. In equation (7), q4 is a coordinate of the fourth Q axis Q4 in the coordinate system the size of which has been transformed, and Cq2 is a coefficient indicating a given value. The values of Cp2 and Cq2 are values at which the corrected image that the user views is appropriately sized, and are adjusted by experiments and simulations performed in advance.

Figure 15:
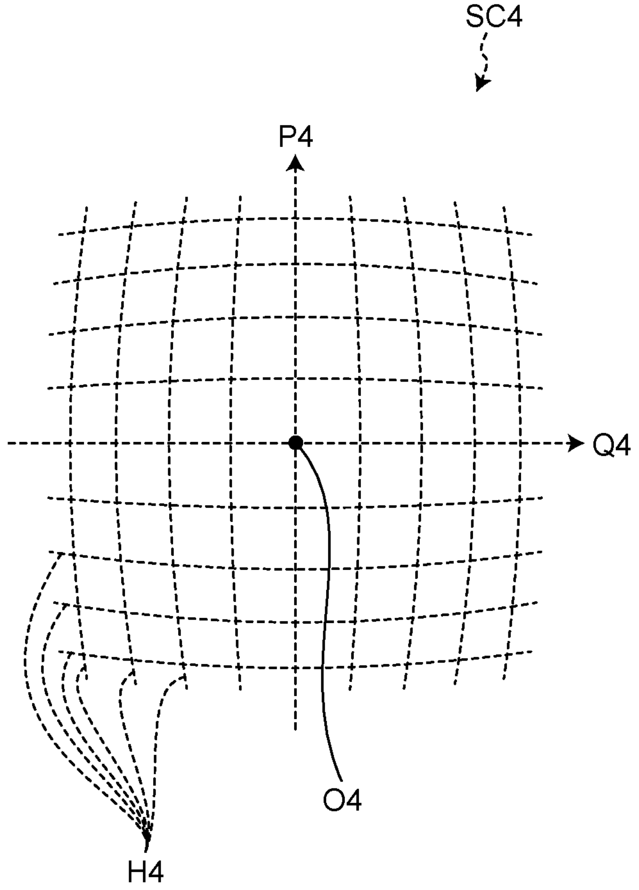
FIG. 15 is a view illustrating a transformed coordinate system.

FIG. 15 is a view illustrating the transformed coordinate system CS4. FIG. 15 illustrates the fourth P axis P4, the fourth Q axis Q4, and additional lines H4. The transformed coordinate system CS4 has distortion that makes the central portion thereof appear bulging relative to the input coordinate system CS1. That is, the degree of distortion of the transformed coordinate system CS4 toward an origin O4 increases as the transformed coordinate system CS4 tends from the origin O4 radially outward (away from the origin O4).

Furthermore, the drive circuit 51 generates a corrected image by applying the coordinates of the input image Gi to the transformed coordinate system CS4. In applying the coordinates of the input image Gi to the transformed coordinate system CS4, the drive circuit 51 may use interpolation, such as what is called bicubic interpolation.

Figure 16:
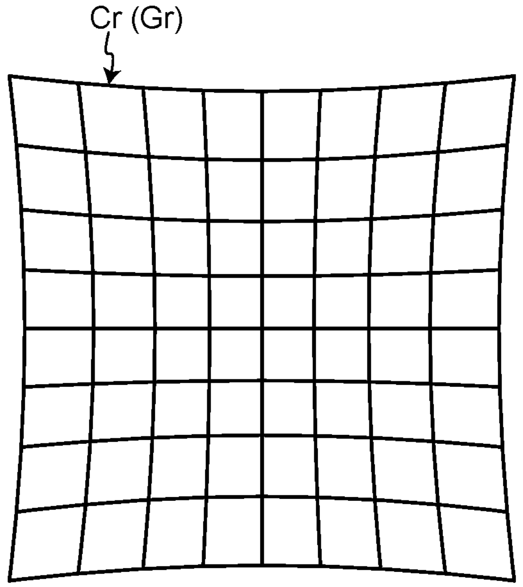
FIG. 16 is a view illustrating a corrected image.

FIG. 16 is a view illustrating a corrected image Gr. FIG. 16 illustrates a corrected solid line portion Cr of the corrected image Gr, in which the solid line portion Ci of the input image Gi has been corrected. The corrected solid line portion Cr includes black solid lines. Sections other than the corrected solid line portion Cr are white in the corrected image Gr.

The corrected image Gr has distortion that make the central portion thereof appear depressed relative to the input image Gi. That is, the degree of distortion of the corrected image Gr from the center thereof radially outward (away from the center of the corrected image Gr) increases as the corrected image Gr tends from the center thereof radially outward. Thus, the degree of distortion of the corrected solid line portion Cr from the center of the corrected image Gr radially outward also increases as the corrected solid line portion Cr tends from the center of the corrected image Gr radially outward.

Subsequently, the drive circuit 51 generates sub-pixel signals indicating gradations of sub-pixels SP on the basis of the corrected image Gr at step S3. Specifically, in the sub-pixel signals, the gradation value of the sub-pixels SP corresponding to the black corrected solid line portion Cr is the smallest, and the gradation value of the sub-pixels SP corresponding to the (white) sections of the corrected image Gr other than the corrected solid line portion Cr is the largest.

Subsequently, the drive circuit 51 outputs the sub-pixel signals at step S4. A voltage corresponding to the gradation value indicated by the sub-pixel signal in each of the sub-pixels SP is applied to the sub-pixel SP, thereby adjusting the translucency of the first liquid crystal layer 53. With this operation, the light emitted from the lighting device 60 and transmitted through the display panel 50 is modulated, to display the corrected image Gr in the display region DA. After executing step S4, the drive circuit 51 returns the computer program to step S1.

As described above, the user views the corrected image Gr displayed in the display region DA through the optical element 20. The image viewed by the user is larger than the corrected image Gr displayed in the display region DA with the optical element 20. The image viewed by the user has distortion relative to the corrected image Gr displayed in the display region DA due to the distortion generated by the optical element 20.

As described above, in the distortion caused by the optical element 20, the degree of distortion toward the center of the image displayed in the display region DA increases with distance from the center of the image. On the contrary, the degree of distortion of the corrected image Gr away from the center thereof increases with distance from the center of the corrected image Gr. In other words, the direction in which the degree of distortion caused by the optical element 20 increases is opposite to the direction in which the degree of distortion of the corrected image Gr increases.

Therefore, the corrected image Gr displayed in the display region DA is viewed by the user through the optical element 20, so that distortion of the corrected image Gr is suppressed. The distortion that the corrected image Gr has is the distortion of the input image Gi. In other words, the corrected image Gr with suppressed distortion corresponds to the input image Gi. Consequently, the user can view the input image Gi by viewing the corrected image Gr displayed in the display region DA through the optical element 20.

In this manner, the drive circuit 51 generates a corrected image Gr obtained by applying correction to the input image Gi to cause distortion, on the basis of the distortion caused by the optical element 20, and displays the corrected image Gr in the display region DA, thereby enabling the distortion to be suppressed.

Second Embodiment

The display device 1 of a second embodiment of the present disclosure will be described next mainly with respect to points that differ from the display device 1 of the first embodiment described above.

Figure 17:
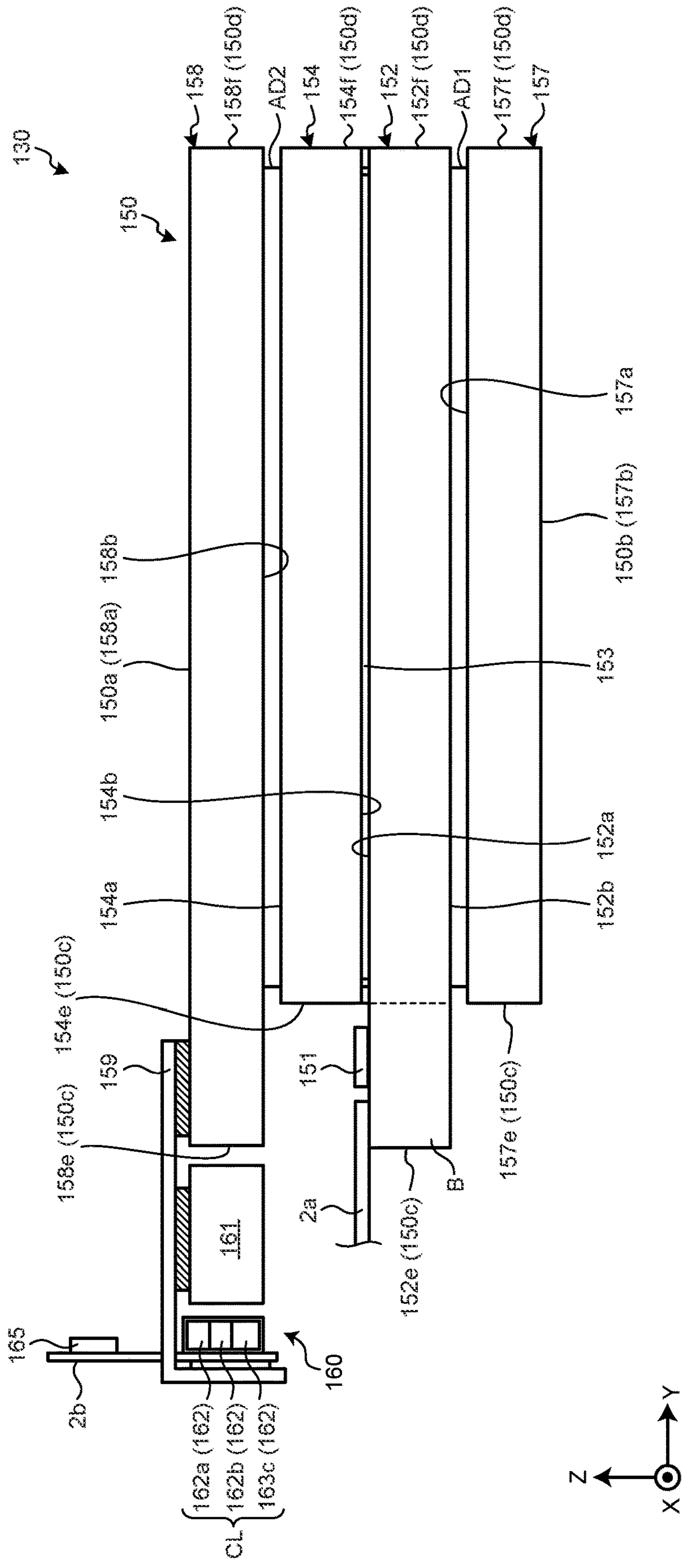
FIG. 17 is a view illustrating a configuration of a display system of a display device according to a second embodiment of the present disclosure.
Figure 18:
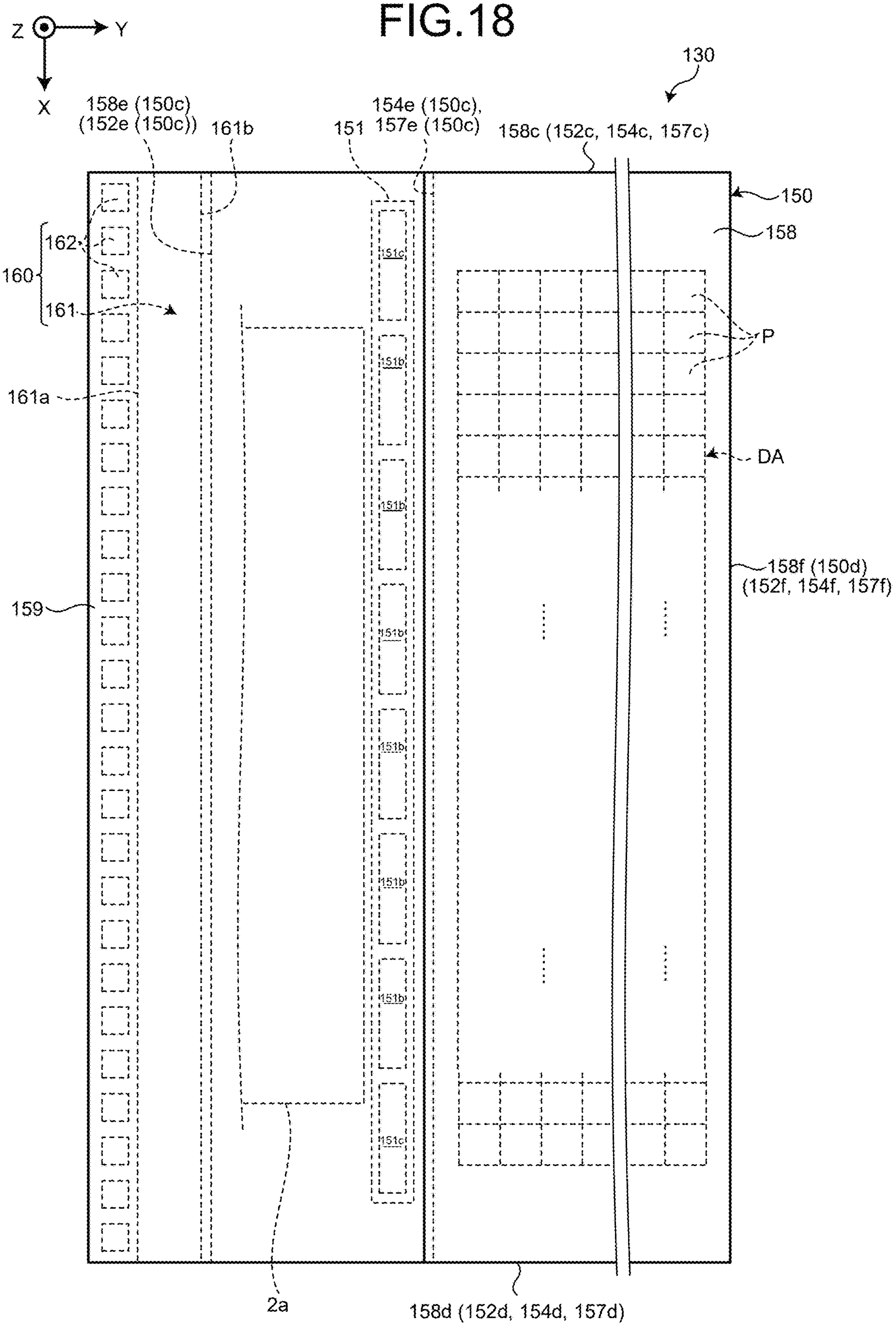
FIG. 18 is a plan view of the display system illustrated in FIG. 17.

FIG. 17 is a view illustrating a configuration of a display system 130 of the display device 1 according to the second embodiment of the present disclosure. FIG. 18 is a plan view of the display system 130 illustrated in FIG. 17. The display system 130 displays images on the basis of image signals output from an external device that is electrically coupled through a first flexible wiring board 2*a*. The display system 130 includes a display panel 150 and a lighting device 160.

The display panel 150 has the display region DA on a front surface 150*a* thereof. The display panel 150 includes a first substrate 152, a first liquid crystal layer 153, a second substrate 154, a first base material 157, and a second base material 158.

The first substrate 152 and the second substrate 154 are rectangular in plan view and translucent. The first substrate 152 has an exposed portion B that is exposed from the second substrate 154 in plan view. The first substrate 152 is placed on a rear surface 154*b* side of the second substrate 154. A front surface 152*a* of the first substrate 152 and the rear surface 154*b* of the second substrate 154 face each other. The first liquid crystal layer 153 is placed between the first substrate 152 and the second substrate 154.

As illustrated in FIG. 18, the display region DA overlaps in plan view a plurality of pixels P aligned in a matrix (row-column configuration) along the X and Y directions. The pixels P are square in plan view. The details of the first liquid crystal layer 153 and the pixels P will be described below.

The first base material 157 and the second base material 158 illustrated in FIGS. 17 and 18 protect the first substrate 152, the second substrate 154, and the first liquid crystal layer 153. The first base material 157 and the second base material 158 are rectangular in plan view and translucent. The first base material 157 is attached to a rear surface 152*b* of the first substrate 152 through a first adhesive portion AD1. The second base material 158 is attached to a front surface 154*a* of the second substrate 154 through a second adhesive portion AD2. The first adhesive portion AD1 and the second adhesive portion AD2 are translucent and are formed as an adhesive cures.

The front surface 152*a* and the rear surface 152*b* of the first substrate 152, the front surface 154*a* and the rear surface 154*b* of the second substrate 154, a front surface 157*a* and a rear surface 157*b* of the first base material 157, and a front surface 158*a* and a rear surface 158*b* of the second base material 158 are all planes and parallel to each other. The front surface 158*a* of the second base material 158 corresponds to a front surface 150*a* of the display panel 150, and the rear surface 157*b* of the first base material 157 corresponds to a rear surface 150*b* of the display panel 150.

A first XL side surface 152*c*, a second XL side surface 154*c*, a third XL side surface 157*c*, and a fourth XL side surface 158*c*, which are side surfaces on the −X side of the first substrate 152, the second substrate 154, the first base material 157, and the second base material 158, are all planes and parallel to each other. Furthermore, a first XR side surface 152*d*, a second XR side surface 154*d*, a third XR side surface 157*d*, and a fourth XR side surface 158*d*, which are side surfaces on the +X side of the first substrate 152, the second substrate 154, the first base material 157, and the second base material 158, are all planes and parallel to each other.

A first YB side surface 152*e*, a second YB side surface 154*e*, a third YB side surface 157*e*, and a fourth YB side surface 158*e*, which are side surfaces on the −Y side of the first substrate 152, the second substrate 154, the first base material 157, and the second base material 158, are all planes and parallel to each other. The first YB side surface 152*e*, the second YB side surface 154*e*, the third YB side surface 157*e*, and the fourth YB side surface 158*e* correspond to a first side surface 150*c* of the display panel 150.

Furthermore, a first YF side surface 152*f*, a second YF side surface 154*f*, a third YF side surface 157*f*, and a fourth YF side surface 158*f*, which are side surfaces on the +Y side of the first substrate 152, the second substrate 154, the first base material 157, and the second base material 158, are all planes and parallel to each other. The first YF side surface 152*f*, the second YF side surface 154*f*, the third YF side surface 157*f*, and the fourth YF side surface 158*f* correspond to a second side surface 150*d* of the display panel 150.

The lighting device 160 is placed at a side of the display panel 150. Specifically, the lighting device 160 is on the first side surface 150*c* side of the display panel 150, and faces the fourth YB side surface 158*e* of the second base material 158. The lighting device 160 emits light from the first side surface 150*c* side of the display panel 150 toward the second side surface 150*d* on the opposite side of the first side surface 150*c* (the details will be described below). The lighting device 160 is fixed to the second base material 158 through a support 159.

A plurality of sets of the light-emitting elements CL are arranged along the X direction. In this second embodiment, one set of the light-emitting elements CL includes a red first light-emitting element 162*a*, a green second light-emitting element 162*b*, and a blue third light-emitting element 162*c*. A light-emitting element 162 emits a laser beam L toward a light-guiding portion 161.

The light-guiding portion 161 is a rectangular parallelepiped, and has an opposed surface 161*a* that faces the light-emitting element 162 and an opposed surface 161*b* that is on the opposite side of the opposed surface 161*a* and that faces the fourth YB side surface 158*e* of the second base material 158. The light-guiding portion 161 has a continuous shape from the fourth XL side surface 158*c* to the fourth XR side surface 158*d* in plan view. The light-guiding portion 161 is translucent. The laser beam L from the light-emitting element 162 enters the light-guiding portion 161 from the opposed surface 161*a*, is diffused in the light-guiding portion 161, and is emitted from the opposed surface 161*b* toward the fourth YB side surface 158*e* of the second base material 158 with a uniform light quantity.

The laser beam L of the light-emitting element 162 that has entered from the fourth YB side surface 158*e* of the second base material 158, propagates through the display panel 150 from the first side surface 150*c* to the second side surface 150*d* of the display panel 150. Specifically, the light from the light-emitting element 162 is reflected by the front surface 152*a* and the rear surface 152*b* of the first substrate 152, the front surface 154*a* and the rear surface 154*b* of the second substrate 154, the front surface 157*a* and the rear surface 157*b* of the first base material 157, and the front surface 158*a* and the rear surface 158*b* of the second base material 158 in the display panel 150, and propagates to the second side surface 150*d*.

Figure 19:
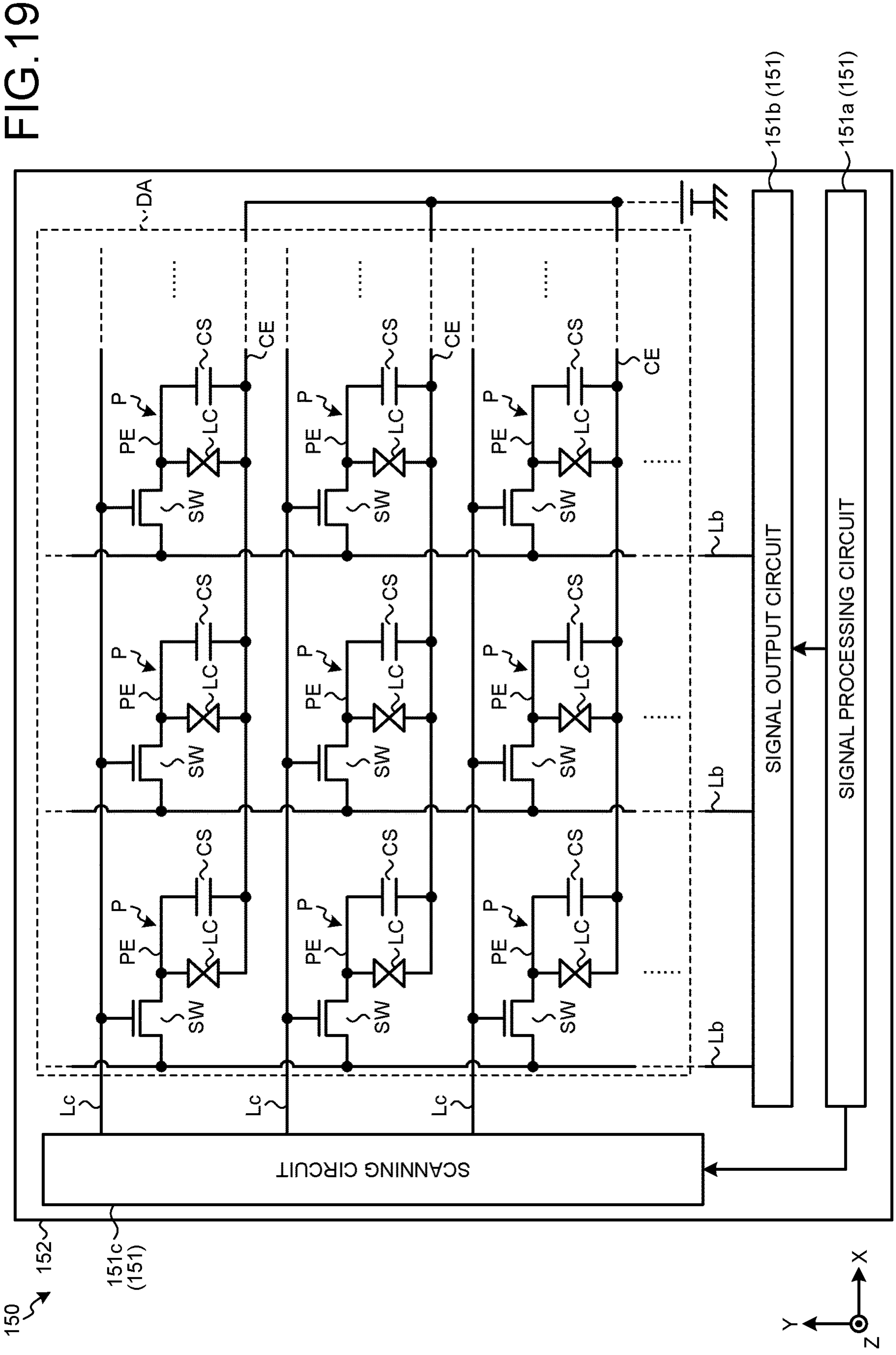
FIG. 19 is a view illustrating a circuit configuration of a display panel illustrated in FIG. 17.

FIG. 19 is a view illustrating a circuit configuration of the display panel 150 illustrated in FIG. 17. The display panel 150 includes a drive circuit 151, as well as a switching element SW, a pixel electrode PE, a common electrode CE, a liquid crystal capacitance LC, and a holding capacitance CS that are included in each of a plurality of the pixels P, similarly to the display panel 50 of first embodiment described above.

The drive circuit 151 is configured similarly to the drive circuit 51 of the first embodiment described above. In other words, the drive circuit 151 includes a signal processing circuit 151*a*, a signal output circuit 151*b*, and a scanning circuit 151*c*.

The signal processing circuit 151*a* generates pixel signals, which will be described below, on the basis of image signals output from the image separation circuit 40, and outputs the generated pixel signals to the signal output circuit 151*b*. The signal output circuit 151*b* outputs the pixel signals to the corresponding pixels P. The signal output circuit 151*b* and the pixels P are electrically coupled through a plurality of signal lines Lb extending along the Y direction.

The scanning circuit 151*c* scans the pixels P in synchronization with the output of the pixel signals by the signal output circuit 151*b*. The scanning circuit 151*c* and the pixels P are electrically coupled through a plurality of scanning lines Lc extending along the X direction. A region demarcated by two signal lines Lb adjacent to each other in the X direction and two scanning lines Lc adjacent to each other in the Y direction in plan view corresponds to a pixel P.

The drive circuit 151 generates a plurality of pixel signals on the basis of image signals. The pixel signals have gradations (the aforementioned red gradation value, green gradation value, and blue gradation value) of the pixels P included in the image signals as information on an image. The drive circuit 151 drives the display panel 150 by outputting pixel signals indicating the gradations of the pixels P to the pixels P (the details will be described below).

Figure 20:
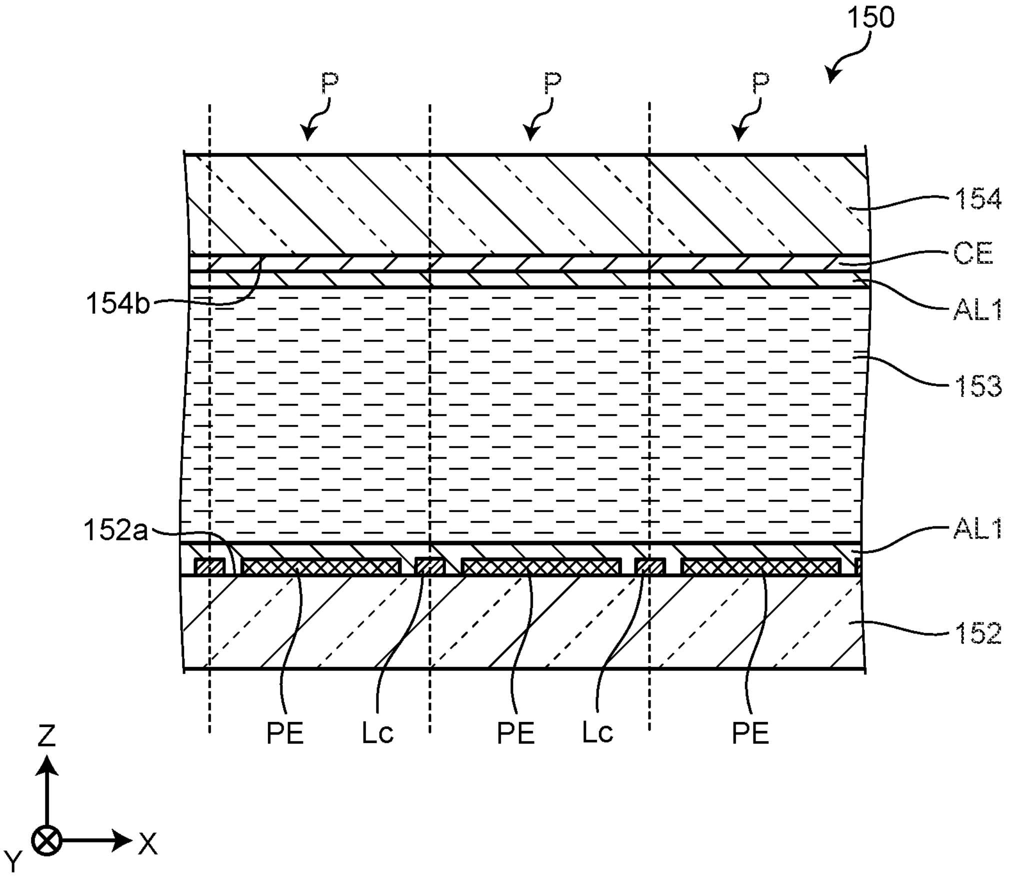
FIG. 20 is a sectional view of the display panel illustrated in FIG. 17.

FIG. 20 is a sectional view of the display panel 150 illustrated in FIG. 17. The first base material 157 and the second base material 158 are omitted in FIG. 20. The signal line Lb (not illustrated), the pixel electrode PE, and the scanning line Lc are placed on the front surface 152*a* of the first substrate 152 while being electrically insulated.

The first orientation film AL1 is placed above the front surface 152*a* of the first substrate 152. The signal line Lb, the pixel electrode PE, and the scanning line Lc are placed between the first substrate 152 and the first orientation film AL1.

The common electrode CE is placed on, and the first orientation film AL1 is placed under the rear surface 152*b* of the second substrate 154. The common electrode CE is placed between the second substrate 154 and the first orientation film AL1. The orientation directions of the two first orientation films AL1 are parallel to each other. The orientation directions of the two first orientation films AL1 may be orthogonal to each other.

In this manner, the display panel 150 of this second embodiment does not include a color filter CF, a light-shielding film SM, a first polarizing plate 55, or a second polarizing plate 56, unlike the display panel 50 of the first embodiment described above.

Figure 21:
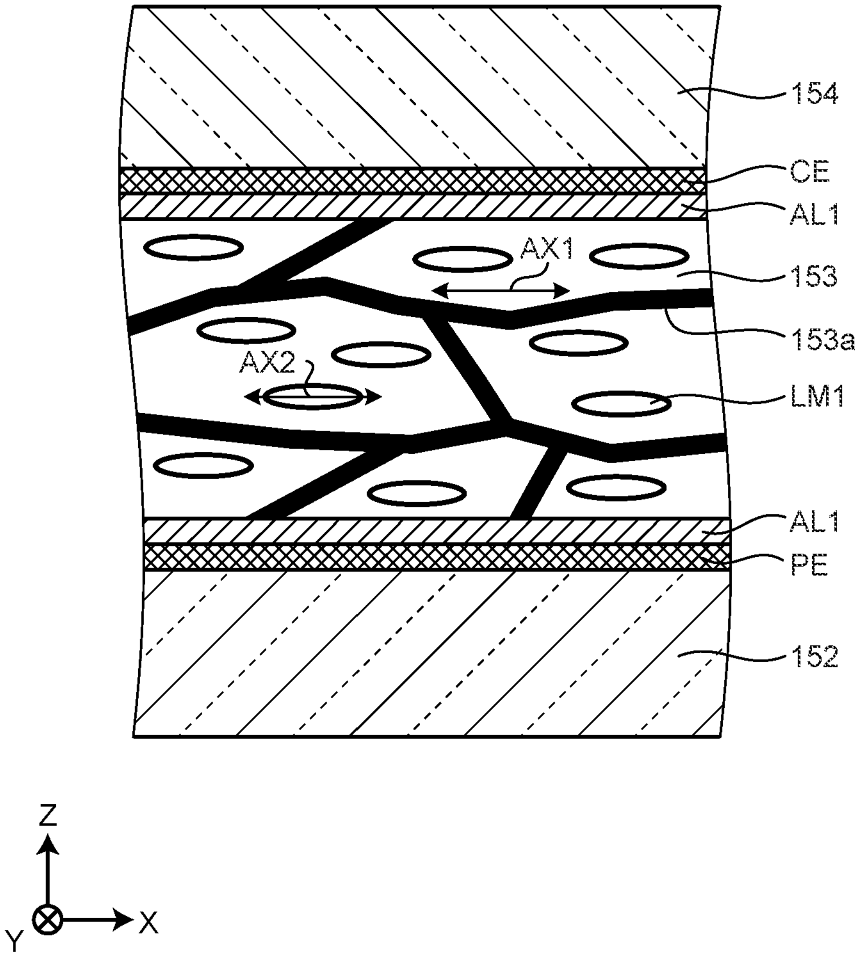
FIG. 21 is a partially enlarged sectional view of the display panel illustrated in FIG. 17.

FIG. 21 is a partially enlarged sectional view of the display panel 150 illustrated in FIG. 17. The first liquid crystal layer 153 of this second embodiment includes polymer dispersed liquid crystal. Specifically, the first liquid crystal layer 153 has a polymer network 153*a* having a three-dimensional network shape.

The polymer network 153*a* is formed by polymerizing monomers oriented by the two first orientation films AL1 with ultraviolet light and heat, for example. The first liquid crystal molecules LM1 are present in the gaps of the polymer network 153*a*.

As illustrated in FIG. 17, a light control circuit 165 is placed on the support 159. The light control circuit 165 of this second embodiment controls the lighting device 160 on the basis of light control signals output from an external device (not illustrated) that is electrically coupled through a second flexible wiring board 2*b*. The light control signal includes information on the light quantity of the light-emitting element 162 (quantity of light emitted by the light-emitting element), which is defined based on the image signal.

The basic operation of the display device 1 when the display panel 150 displays images will be described next. The drive circuit 151 and the light control circuit 165 drive the display panel 150 and the lighting device 160 by a field sequential method.

A case will be described first in which no image signals or light control signals are transmitted to the display device 1 and the display panel 150 is not displaying images. In this case, the drive circuit 151 does not output pixel signals and no voltage is applied to the pixel electrode PE. The light control circuit 165 does not drive the lighting device 160, and no light is emitted from the light-emitting element 162.

When no voltage is applied to the pixel electrode PE, an optical axis AX1 of the polymer network 153*a* and an optical axis AX2 of the first liquid crystal molecule LM1 are regulated by the two first orientation films AL1, as illustrated in FIG. 21. In the present embodiment, when no voltage is applied to the pixel electrode PE, the optical axis of the polymer network 153*a* and the optical axis of the first liquid crystal molecule LM1 are parallel to each other and along the X direction.

The ordinary refractive index of the polymer network 153*a* and the ordinary refractive index of the first liquid crystal molecule LM1 are equal to each other. Thus, when no voltage is applied to the pixel electrode PE, the difference between the refractive index of the polymer network 153*a* and the refractive index of the first liquid crystal molecule LM1 is zero in all directions. Consequently, light propagating in the display panel 150 is not scattered.

In other words, in this case, the first liquid crystal layer 153 is in a transmissive state of not scattering light propagating in the display panel 150. When the first liquid crystal layer 153 is in the transparent state, no image is displayed in the display region DA of the display panel 150.

A case will be described next in which image signals and light control signals are transmitted to the display device 1 and the display panel 150 displays an image. A state will be described first in which the drive circuit 151 outputs pixel signals and a voltage is applied to the pixel electrode PE.

When a voltage is applied to the pixel electrode PE, the optical axis AX2 of the first liquid crystal molecule LM1 tilts to the X direction according to the magnitude of the voltage. On the contrary, the optical axis AX1 of the polymer network 153*a* does not tilt and follows the X direction even when the voltage is applied to the pixel electrode PE. In other words, the optical axis AX2 of the first liquid crystal molecule LM1 tilts to the optical axis AX1 of the polymer network 153*a*.

Thus, a difference arises between the refractive index of the polymer network 153*a* and the refractive index of the first liquid crystal molecule LM1. At this time, as the light control circuit 165 emits light from the light-emitting element 162 on the basis of the light control signal, light propagating in the display panel 150 is scattered. In other words, in this case, the first liquid crystal layer 153 is in a scattering state of scattering the light propagating in the display panel 150. The light scattered in the first liquid crystal layer 153 is emitted externally from the pixels P (from the front surface 150*a* side of the display panel 150).

The quantity of the light scattered in the first liquid crystal layer 153 changes depending on the degree of scattering by the first liquid crystal layer 153. The degree of scattering in the first liquid crystal layer 153 is defined by the inclination of the first liquid crystal molecules LM1, in other words, the magnitude of the voltage applied to the pixel electrode PE. The magnitude of the voltage is defined based on the gradation values (the aforementioned red gradation value, green gradation value, and blue gradation value) of the pixels P in the pixel signals. The gradation value of the pixels P is defined for each color of light emitted from the pixels P. The number of colors of the light emitted from the pixels P is three, and the colors of the laser beams L from the light-emitting elements 162 corresponds to the colors of the light emitted from the pixels P.

The drive circuit 151 generates a pixel signal for each of the pixels P and transmits the pixel signals to the pixels P. With this operation, in each of the pixels P, a voltage corresponding to the gradation value is applied to the pixel electrode PE, the first liquid crystal molecule LM1 corresponding to the pixel P tilts according to the magnitude of the gradation value, and the degree of scattering in the first liquid crystal layer 153 changes, thereby changing the quantity of the light emitted from the pixel P. The quantity of the light emitted from the pixel P increases with a higher gradation value.

Figure 22:
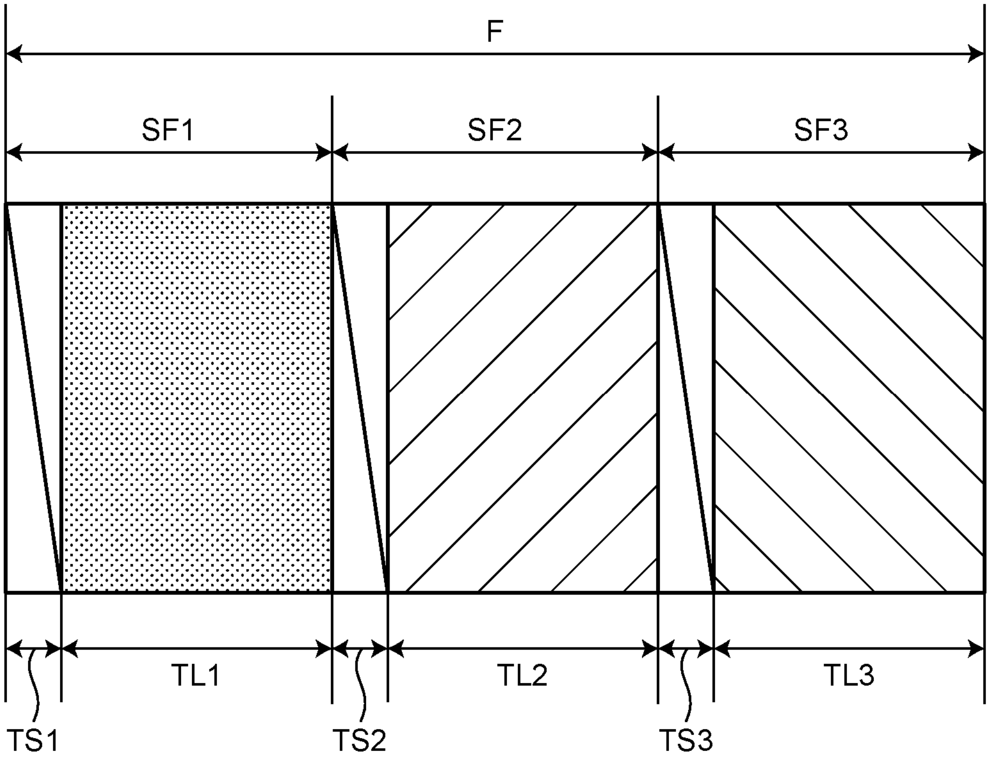
FIG. 22 is a view illustrating operations of a drive circuit and a light control circuit when an image is displayed on the display panel illustrated in FIG. 17.

FIG. 22 is a view illustrating operations of the drive circuit 151 and the light control circuit 165 when an image is displayed on the display panel 150 illustrated in FIG. 17. FIG. 22 illustrates the operations of the drive circuit 151 and the light control circuit 165 per frame F. One frame F has a first subframe SF1, a second subframe SF2, and a third subframe SF3 in this order.

In the first subframe SF1, red light included in the image is emitted from the pixel P. Specifically, the drive circuit 151 scans the pixels P during a first scanning period TS1, selects the pixel P from which red light is emitted, and transmits, to the selected pixel P, a first pixel signal indicating the red gradation included in the image. As a result, the first liquid crystal layer 153 corresponding to the selected pixel P becomes in a scattering state according to the red gradation value. The voltage applied to the pixel electrode PE is held during a first emission period TL1 and reset at the end of the first subframe SF1.

The light control circuit 165 causes the first light-emitting element 162*a* to emit light during the first emission period TL1. The red first laser beam LR of the first light-emitting element 162*a* is diffused in the light-guiding portion 161 and propagates in the display panel 150. As a result, the red first laser beam LR is scattered according to the degree of scattering in the first liquid crystal layer 153 and emitted externally in the first liquid crystal layer 153 corresponding to the pixel P selected by the drive circuit 151. In other words, red light with a gradation corresponding to the gradation value of the first pixel signal is emitted from the pixel P selected by the drive circuit 151. With this operation, a red image is displayed in the display region DA.

In the second subframe SF2, green light included in the image is emitted from the pixel P. Specifically, the drive circuit 151 scans the pixels P during a second scanning period TS2, selects the pixel P from which green light is emitted, and transmits, to the selected pixel P, a second pixel signal indicating the green gradation included in the image. As a result, the first liquid crystal layer 153 corresponding to the selected pixel P becomes in a scattering state according to the green gradation value. The voltage applied to the pixel electrode PE is held during a second emission period TL2 and reset at the end of the second subframe SF2.

The light control circuit 165 causes the second light-emitting element 162*b* to emit light during the second emission period TL2. The green second laser beam LG of the second light-emitting element 162*b* is diffused in the light-guiding portion 161 and propagates in the display panel 150. As a result, the green second laser beam LG is scattered according to the degree of scattering in the first liquid crystal layer 153 and emitted externally in the first liquid crystal layer 153 corresponding to the pixel P selected by the drive circuit 151. In other words, green light with a gradation corresponding to the gradation value of the second pixel signal is emitted from the pixel P selected by the drive circuit 151. With this operation, a green image is displayed in the display region DA.

In the third subframe SF3, blue light included in the image is emitted from the pixel P. Specifically, the drive circuit 151 scans the pixels P during a third scanning period TS3, selects the pixel P from which blue light is emitted, and transmits, to the selected pixel P, a third pixel signal indicating the blue gradation included in the image. As a result, the first liquid crystal layer 153 corresponding to the selected pixel P becomes in a scattering state according to the blue gradation value. The voltage applied to the pixel electrode PE is held during a third emission period TL3 and reset at the end of the third subframe SF3.

The light control circuit 165 causes the third light-emitting element 162*c* to emit light during the third emission period TL3. The blue third laser beam LB of the third light-emitting element 162*c* is diffused in the light-guiding portion 161 and propagates in the display panel 150. As a result, the blue third laser beam LB is scattered according to the degree of scattering in the first liquid crystal layer 153 and emitted externally in the first liquid crystal layer 153 corresponding to the pixel P selected by the drive circuit 151. In other words, blue light with a gradation corresponding to the gradation value of the third pixel signal is emitted from the pixel P selected by the drive circuit 151. With this operation, a blue image is displayed in the display region DA.

The time of one frame F is defined as the time at which the user's eyes E perceive composite light of the red light, the green light, and the blue light emitted in one frame F. In other words, the user's eyes E perceive the light in the color and gradation composed of the red, green, and blue light. Thus, the user views a composite image of the red image, the green image, and the blue image displayed in the display region DA.

Figure 23:
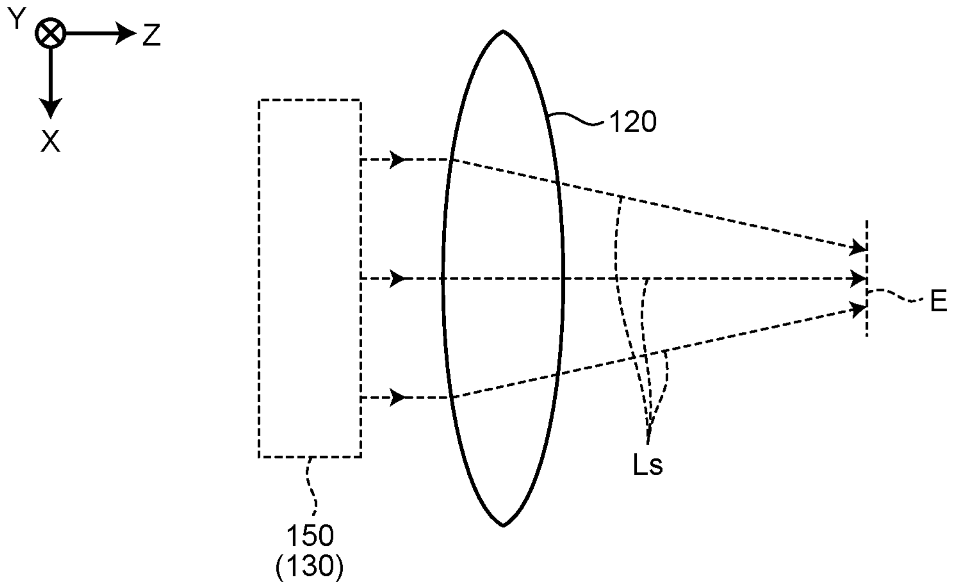
FIG. 23 is a side view of an optical element of the display device according to the second embodiment of the present disclosure.

FIG. 23 is a side view of an optical element 120 of the display device 1 according to the second embodiment of the present disclosure. The optical element 120 of this second embodiment is a glass lens and has the same lens action as the optical element 20 of the first embodiment described above. That is, the lens action of the optical element 120 allows the light emitted from the display panel 150 to be collected to the user's eyes E and the user to view an enlarged image of the image displayed in the display region DA.

Distortion occurs also in the optical element 120 of this second embodiment. The distortion generated by the optical element 120 of this second embodiment and the distortion of the optical element 20 of the first embodiment described above are opposite in the direction in which the degree of distortion increases.

Specifically, the image viewed by the user through the optical element 120 has distortion that makes the central portion of the image appear depressed relative to the image displayed in the display region DA. In other words, in the distortion caused by the optical element 20, the degree of distortion away from the center of the image displayed in the display region DA increases with distance from the center of the image. To address this, the drive circuit 151 suppresses the distortion generated by the optical element 120, as described next.

For simplicity of explanation, the distortion generated by the optical element 120 of this second embodiment and the distortion by the optical element 20 of the first embodiment described above are assumed to have the same magnitude of distortion.

Figure 24:
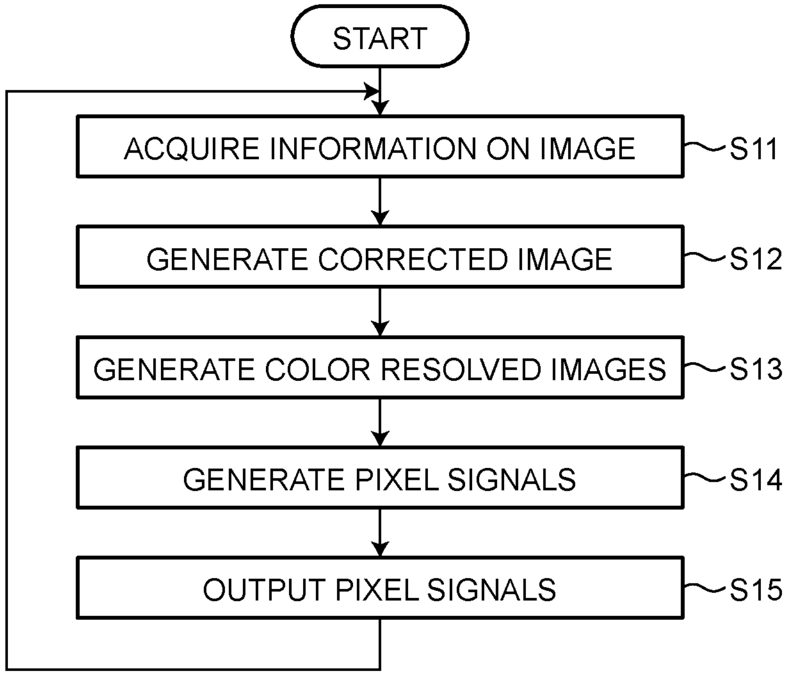
FIG. 24 is a flowchart executed by the drive circuit illustrated in FIG. 19.

FIG. 24 is a flowchart executed by the drive circuit 151 illustrated in FIG. 19. The drive circuit 151 acquires information on an image at step S11. The drive circuit 151 acquires the gradation values of the pixels P at step S11. For simplicity of explanation, the image included in the image signal is the same as the input image Gi illustrated in FIG. 14, as in the first embodiment described above.

Subsequently, the drive circuit 151 generates a corrected image Gr at step S12. Specifically, the drive circuit 151 transforms the size of the input coordinate system CS1 by using the aforementioned equations (1) and (2).

Subsequently, the drive circuit 51 performs distortion processing to distort the coordinate system the size of which has been transformed, on the basis of the distortion caused by the optical element 120. The distortion processing causes the same distortion as the distortion caused by the optical element 120 for the coordinate system the size of which has been transformed, with the origin O1 as a reference point.

As described above, in the distortion caused by the optical element 120, the degree of distortion away from the center of the image displayed in the display region DA increases with distance from the center of the image. To address this, the distortion processing of this second embodiment moves a given point in the aforementioned size-transformed coordinate system in the direction away from the origin, and the amount of movement of the given point in the direction away from the origin is increased as the given point is farther from the origin.

Specifically, the drive circuit 151 performs distortion processing by using the aforementioned equation (5) and equations (8) and (9) to be described below. The coordinate system on which the distortion processing was performed (not illustrated) is a rectangular coordinate system in which a third P axis corresponding to the second P axis and a third Q axis corresponding to the second Q axis are orthogonal to each other.

$$p3 = p2 \times (1 + k1 \times r^2 + k2 \times r^4 + k3 \times r^6) \quad (8)$$

$$p3 = p2 \times (1 + k1 \times r^2 + k2 \times r^4 + k3 \times r^6) \quad (9)$$

As described above, the distortion generated by the optical element 120 of this second embodiment and the distortion of the optical element 20 of the first embodiment described above are opposite in the direction in which the degree of distortion increases. This means that equations (8) and (9) differ from the aforementioned equations (3) and (4) in the signs given to k1, k2, and k3. As in the first embodiment described above, k1, k2, and k3 are coefficients indicating given values and are positive values.

Furthermore, the drive circuit 151 generates a coordinate system CS4 the size of which has been transformed and on which the distortion processing was performed by using equations (6) and (7) (see FIG. 25 to be described below). The transformed coordinate system CS4 is a rectangular coordinate system in which a fourth P axis P4 corresponding to the third P axis and a fourth Q axis Q4 corresponding to the third Q axis are orthogonal to each other.

Figure 25:
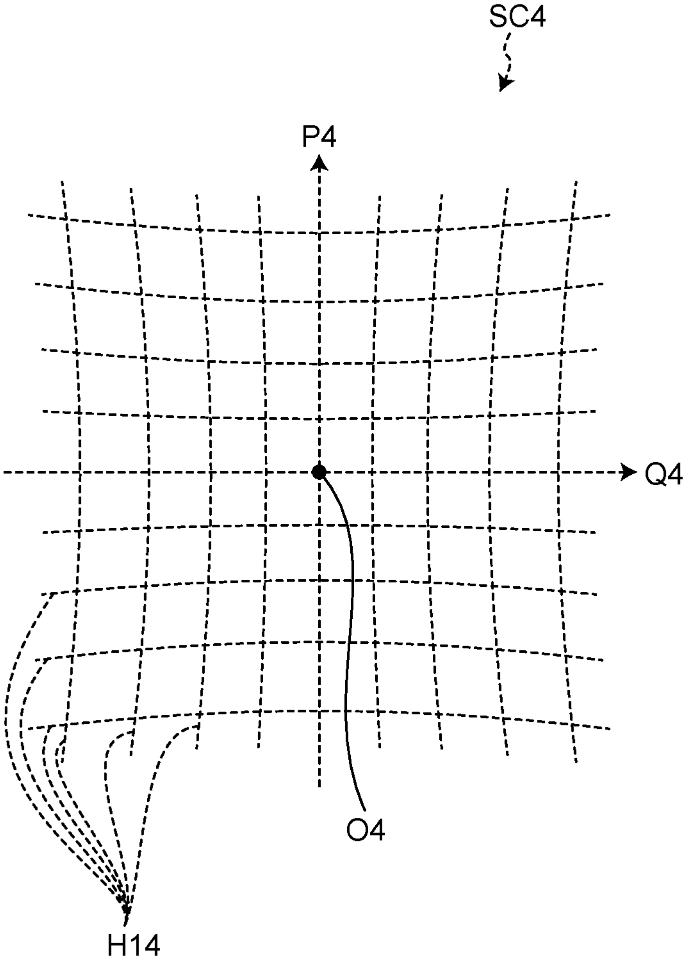
FIG. 25 is a view illustrating a transformed coordinate system according to the second embodiment.

FIG. 25 is a view illustrating the transformed coordinate system CS4 according to the second embodiment. The transformed coordinate system CS4 of this second embodiment has distortion that makes the central portion thereof appear depressed relative to the input coordinate system CS1. That is, the degree of distortion of the transformed coordinate system CS4 from the origin O4 radially outward increases as the transformed coordinate system CS4 tends from the origin O4 radially outward (away from the origin O4).

Furthermore, the drive circuit 151 generates a corrected image by applying the coordinates of the input image Gi to the transformed coordinate system CS4.

Figure 26:
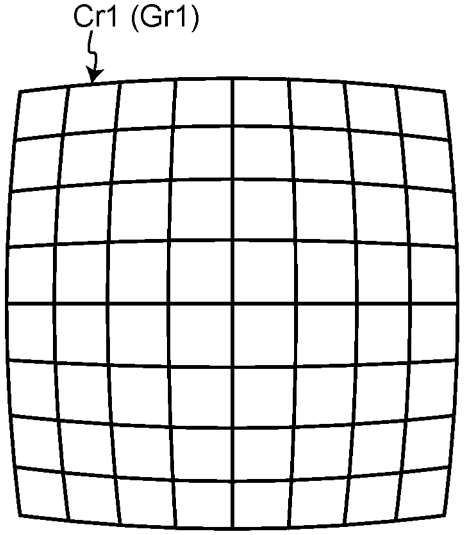
FIG. 26 is a view illustrating a corrected image according to the second embodiment.

FIG. 26 is a view illustrating a corrected image Gr1 according to the second embodiment. FIG. 26 illustrates a corrected solid line portion Cr1 of the corrected image Gr1, in which the solid line portion Ci of the input image Gi has been corrected. The corrected solid line portion Cr1 includes black solid lines. Sections other than the solid line portion Cr1 are white in the corrected image Gr1.

The corrected image Gr1 has distortion that makes the central portion thereof appear bulging relative to the input image Gi. That is, the degree of distortion of the corrected image Gr1 toward the center thereof increases as the corrected image Gr1 tends from the center thereof radially outward (away from the center of the corrected image Gr). Thus, the degree of distortion of the corrected solid line portion Cr from the center of the corrected image Gr radially outward also increases as the corrected solid line portion Cr tends from the center of the corrected image Gr radially outward.

Furthermore, the drive circuit 151 generates a plurality of color resolved images obtained by resolving the corrected image Gr for each color of the laser beam at step S13. As described above, the first laser beam LR is a red laser beam L, the second laser beam LG is a green laser beam L, and the third laser beam LB is a blue laser beam L. In other words, the drive circuit 151 generates a red first color resolved image corresponding to the first laser beam LR, a green second color resolved image corresponding to the second laser beam LG, and a blue third color resolved image corresponding to the third laser beam LB.

The first color resolved image has a black first corrected solid line portion with the same shape as the corrected solid line portion Cr of the corrected image Gr. Sections other than the first corrected solid line portion are relatively bright red in the first color resolved image. The second color resolved image has a black second corrected solid line portion with the same shape as the corrected solid line portion Cr of the corrected image Gr. Sections other than the second corrected solid line portion are green in the second color resolved image and have the same brightness as the sections other than the first corrected solid line portion in the first color resolved image. The third color resolved image has a black third corrected solid line portion with the same shape as the corrected solid line portion Cr of the corrected image Gr. Sections other than the third corrected solid line portion are blue in the third color resolved image and have the same brightness as the sections other than the first corrected solid line portion in the first color resolved image.

Subsequently, the drive circuit 151 generates the pixel signals at step S14. Specifically, the drive circuit 151 generates a first pixel signal indicating the red gradation on the basis of the red first color resolved image. In the first pixel signal, the gradation value of the pixel P corresponding to the first corrected solid line portion of the first color resolved image is the smallest, and the gradation value of the pixel P corresponding to the sections other than the first corrected solid line portion of the first color resolved image is the largest.

The drive circuit 151 also generates a second pixel signal indicating the green gradation on the basis of the green second color resolved image. In the second pixel signal, the gradation value of the pixel P corresponding to the second corrected solid line portion of the second color resolved image is the smallest, and the gradation value of the pixel P corresponding to the sections other than the second corrected solid line portion of the second color resolved image is the largest.

Furthermore, the drive circuit 151 generates a third pixel signal indicating the blue gradation on the basis of the blue third color resolved image. In the third pixel signal, the gradation value of the pixel P corresponding to the third corrected solid line portion of the third color resolved image is the smallest, and the gradation value of the pixel P corresponding to the sections other than the third corrected solid line portion of the third color resolved image is the largest.

Subsequently, the drive circuit 151 outputs the pixel signals at step S15. Specifically, the drive circuit 151 outputs a first pixel signal during the first scanning period TS1. Furthermore, the first light-emitting element 162*a* emits light during the first emission period TL1. With this operation, the red first color resolved image is displayed in the display region DA in the first subframe SF1.

The drive circuit 151 also outputs a second pixel signal during the second scanning period TS2. Furthermore, the second light-emitting element 162*b* emits light during the second emission period TL2. With this operation, the green second color resolved image is displayed in the display region DA in the second subframe SF2.

Furthermore, the drive circuit 151 outputs a third pixel signal during the third scanning period TS3. The third light-emitting element 162*c* emits light during the third emission period TL3. With this operation, the blue third color resolved image is displayed in the display region DA in the third subframe SF3.

In other words, the first color resolved image, the second color resolved image, and the third color resolved image are displayed in this order in one frame F in this second embodiment. After executing step S15, the drive circuit 151 returns the computer program to step S11.

The user views a composite image of the first color resolved image, the second color resolved image, and the third color resolved image displayed in the display region DA in an enlarged state through the optical element 120. The image corresponds to the corrected image Gr1 with distortion suppressed, that is, the input image Gi. In other words, the user can view the input image Gi by viewing the composite image of the first color resolved image, the second color resolved image, and the third color resolved image displayed in the display region DA through the optical element 20.

Although preferred embodiments of the present disclosure have been described above, the present disclosure is not limited to such embodiments. What is disclosed in the embodiments is merely an example, and various modifications can be made without departing from the intent of the present disclosure. Any appropriate modification made to the extent not departing from the intent of the present disclosure naturally belongs to the technical scope of the present disclosure.

For example, the first display panel 50*a* and the second display panel 50*b* illustrated in FIG. 3 may be integral with each other. In this case, the integrated first display panel 50*a* and second display panel 50*b* have one display region DA, and in the display region DA, the image for the left eye is displayed on the −X side and the image for the right eye on the +X side. Furthermore, in this case, the first lighting device 60*a* and the second lighting device 60*b* may be integral with each other.

The display panel 50 may be removably attached to the mounting part 10.

The display device 1 may be a vehicle navigation system (what is called a car navigation system) instead of a VR system. In this case, the display device 1 is attached to a vehicle and an image of a map, for example, is displayed in the display region DA.

Figure 27:
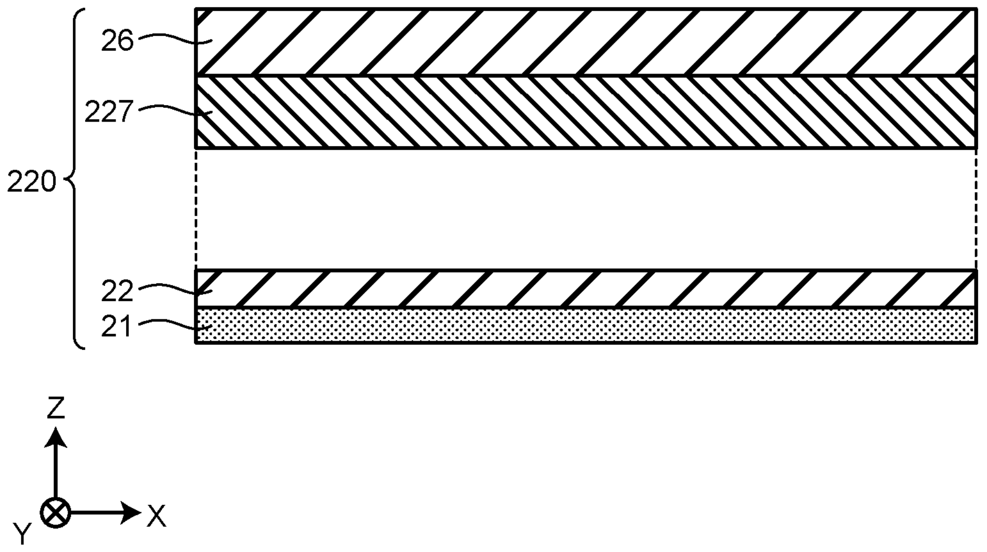
FIG. 27 is a sectional view of an optical element according to a modification of the first embodiment of the present disclosure.

FIG. 27 is a sectional view of an optical element 220 according to a modification of the first embodiment of the present disclosure. The optical element 220 of the present modification does not include the second phase difference plate 23, the reflective polarizing plate 24, and the third phase difference plate 25 of the first embodiment described above, but includes a second liquid crystal element 227.

Specifically, the optical element 220 includes the first phase difference plate 21, the transflective layer 22, the second liquid crystal element 227, and the liquid crystal element 26. The first phase difference plate 21, the transflective layer 22, the second liquid crystal element 227, and the liquid crystal element 26 are aligned in this order along the Z direction from the −Z side to the +Z side.

The transflective layer 22 and the second liquid crystal element 227 are placed apart from each other. That is, there is an air layer between the transflective layer 22 and the second liquid crystal element 227. Furthermore, the second liquid crystal element 227 and the liquid crystal element 26 are stacked in close contact with each other.

Figure 28:
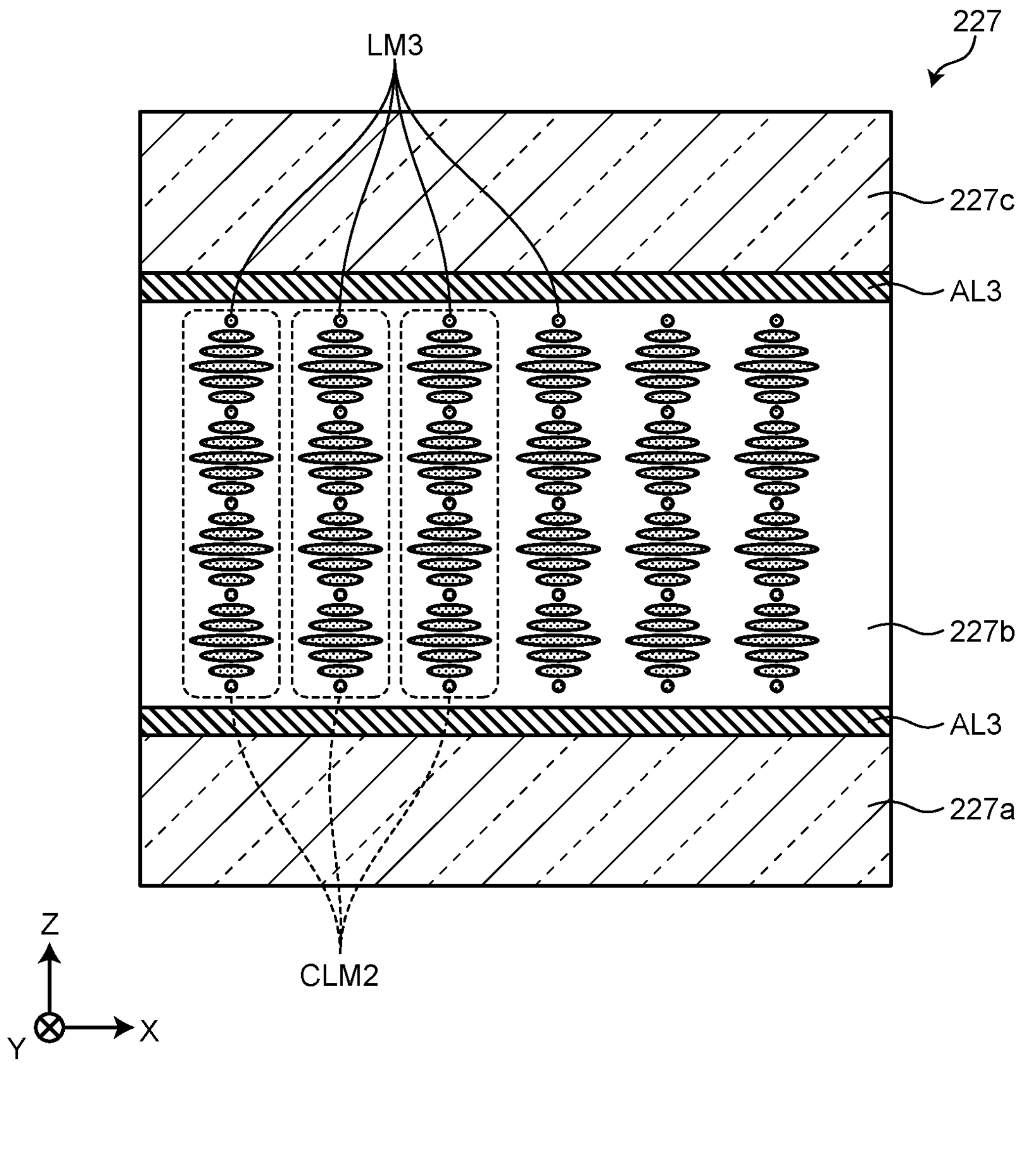
FIG. 28 is a sectional view of a second liquid crystal element.

FIG. 28 is a sectional view of the second liquid crystal element 227. The second liquid crystal element 227 reflects first circularly polarized light and transmits second circularly polarized light.

The second liquid crystal element 227 includes a fifth substrate 227*a*, a third liquid crystal layer 227*b*, and a sixth substrate 227*c*. The fifth substrate 227*a*, the third liquid crystal layer 227*b*, and the sixth substrate 227*c* are all translucent and are aligned in this order along the Z direction from the −Z side to the +Z side. The fifth substrate 227*a* and the sixth substrate 227*c* are rectangular in plan view.

A third orientation film AL3 is placed both on the front surface of the fifth substrate 227*a* and the rear surface of the sixth substrate 227*c*. The third liquid crystal layer 227*b* is placed between the two third orientation films AL3 in the Z direction. The third liquid crystal layer 227*b* has a cholesteric liquid crystal.

The third liquid crystal layer 227*b* includes a plurality of third liquid crystal molecules LM3. The orientation of the major axis of the third liquid crystal molecules LM3 is orthogonal to the Z direction.

The third liquid crystal layer 227*b* includes a plurality of sets of third liquid crystal molecules CLM2, each of which includes a plurality of the third liquid crystal molecules LM3 aligned along the Z direction. The third liquid crystal molecules LM3 are placed in a helical fashion in one set of the third liquid crystal molecules CLM2. The rotation direction of the third liquid crystal molecules LM3 in one set of the third liquid crystal molecules CLM2 is counterclockwise in plan view, in other words, the same as the rotation direction of the first circularly polarized light in plan view. The rotation angle of the third liquid crystal molecules LM3 in plan view is 360° or more in one set of the third liquid crystal molecules CLM2.

Figure 29:
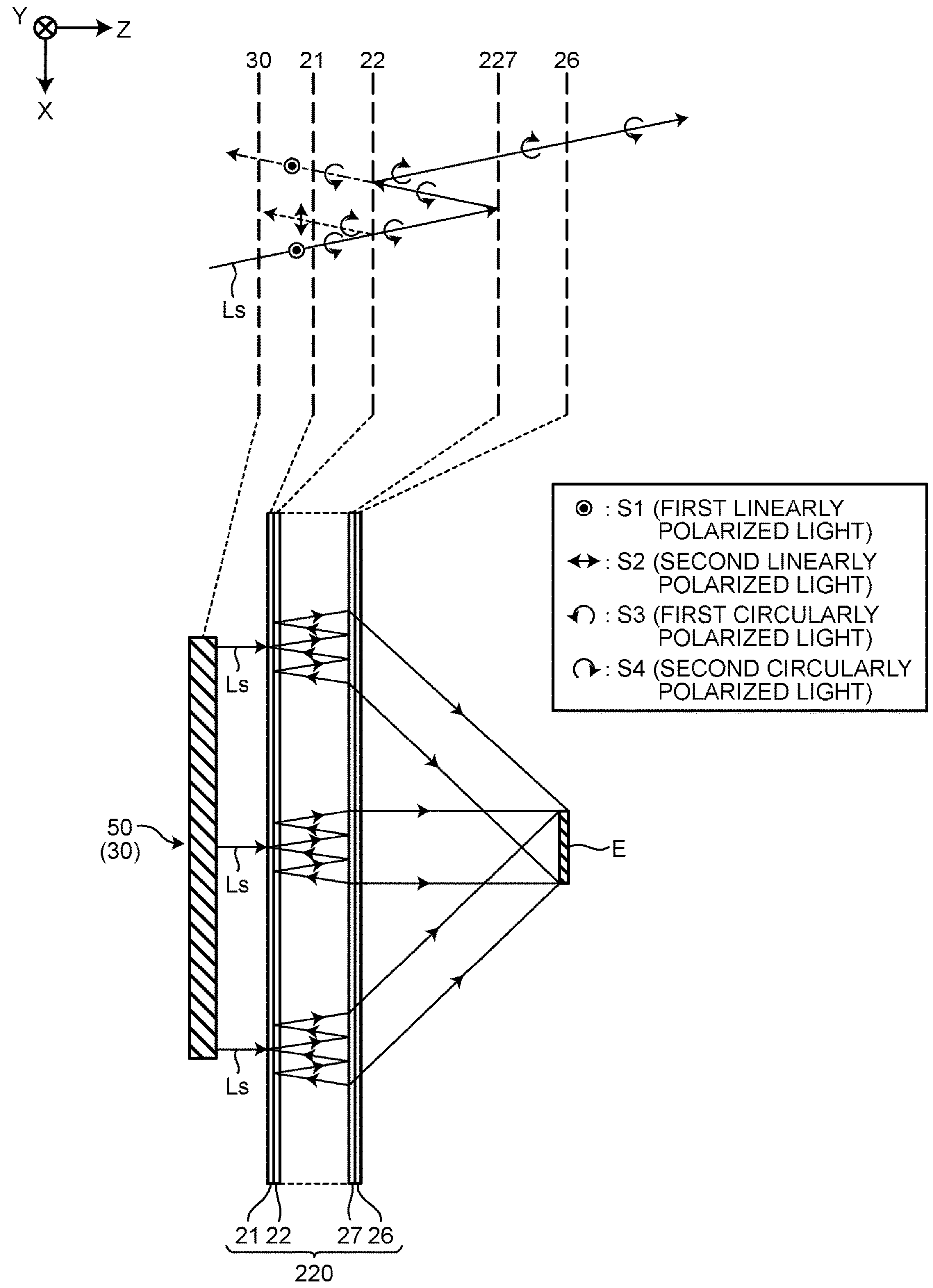
FIG. 29 is a view illustrating a lens action of the optical element illustrated in FIG. 27.

FIG. 29 is a view illustrating the lens action of the optical element 220 illustrated in FIG. 27. FIG. 29 illustrates the symbols S1, S2, S3, and S4 similarly to FIG. 12.

Emitted light Ls emitted from the display panel 50 toward the +Z side enters the optical element 220. The emitted light Ls emitted from the display panel 50 corresponds to the first linearly polarized light. The emitted light Ls is converted to the first circularly polarized light by passing through the first phase difference plate 21.

Part of the emitted light Ls transmitted through the first phase difference plate 21 is reflected by the transflective layer 22. Part of the emitted light Ls reflected by the transflective layer 22 (illustrated by the dashed line in FIG. 29) is converted to the second circularly polarized light, and is further converted to the second linearly polarized light by passing through the first phase difference plate 21.

On the contrary, another part of the emitted light Ls transmitted through the first phase difference plate 21 passes through the transflective layer 22. The emitted light Ls transmitted through the transflective layer 22 is the first circularly polarized light and is reflected by the second liquid crystal element 227. Part of the emitted light Ls reflected by the second liquid crystal element 227 passes through the transflective layer 22. The emitted light Ls transmitted through the transflective layer 22 (illustrated by the dash-dotted line in FIG. 29) is converted to the first linearly polarized light by passing through the first phase difference plate 21.

On the contrary, another part of the emitted light Ls reflected by the second liquid crystal element 227 is reflected by the transflective layer 22, is converted to the second circularly polarized light, and passes through the second liquid crystal element 227. Furthermore, the emitted light Ls is collected to the user's eyes E by the lens action of the liquid crystal element 26.

The display device 1 of the second embodiment described above may include one of the optical element 20 of the first embodiment described above and the optical element 220 of the modification described above instead of the optical element 120. In this case, the display panel 150 includes the second polarizing plate 56 on the front surface 150*a*. As a result, the optical element 20 or the optical element 220 collects the emitted light Ls of the display panel 150 to the user's eyes E.

It is understood that any other effects brought about by the modes described in the embodiments that are obvious from the description of the present specification or that would be conceived of by a person skilled in the art are naturally brought about by the present disclosure.

What is claimed is:

1. A display device comprising:

a display panel;

an optical element configured to collect light emitted from the display panel to user's eyes; and a drive circuit configured to drive the display panel based on an image signal having information on an image to generate an image, wherein the display panel has a flat plate shape, the optical element has a flat plate shape, the display panel and the optical element are arranged facing each other in a first direction perpendicular to a direction in which the display panel and the optical element each extend, the drive circuit corrects the image by applying correction to the image to cause distortion, based on distortion aberration caused by the optical element, and allows the display panel to display the corrected image, the display panel emits linearly polarized light toward the optical element, and the optical element comprises:

a phase difference plate configured to convert the linearly polarized light to circularly polarized light; and a liquid crystal element configured to collect the circularly polarized light to the user's eyes.

2. The display device according to claim 1, wherein a degree of distortion of the corrected image from a center of the corrected image radially outward increases as the corrected image tends from the center of the corrected image radially outward.

3. A display method performed by a display device configured to collect light emitted by a display panel to user's eyes by means of an optical element, the display method comprising:

acquiring an image signal including information on an image to generate an image;

correcting the image based on distortion aberration caused by the optical element; and displaying the corrected image on the display panel, wherein the display panel has a flat plate shape, the optical element has a flat plate shape, the display panel and the optical element are arranged facing each other in a first direction perpendicular to a direction in which the display panel and the optical element each extend, the display panel emits linearly polarized light toward the optical element, and the optical element comprises:

a phase difference plate configured to convert the linearly polarized light to circularly polarized light; and a liquid crystal element configured to collect the circularly polarized light to the user's eyes.

4. The display method according to claim 3, wherein, at the correcting, the display device increases a degree of distortion radially outward as the image tends from a center of the image radially outward.

* * * * *